US012073482B2

(12) United States Patent
Vemury

(10) Patent No.: US 12,073,482 B2
(45) Date of Patent: Aug. 27, 2024

(54) SELECTIVE BIOMETRIC ACCESS CONTROL

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 661 days.

(21) Appl. No.: 16/366,584

(22) Filed: Mar. 27, 2019

(65) Prior Publication Data

US 2019/0220944 A1    Jul. 18, 2019

Related U.S. Application Data

(62) Division of application No. 15/223,172, filed on Jul. 29, 2016, now Pat. No. 11,538,126.

(Continued)

(51) Int. Cl.
*G06Q 50/26* (2024.01)
*G06F 16/22* (2019.01)
(Continued)

(52) U.S. Cl.
CPC ........... *G06Q 50/265* (2013.01); *G06F 16/22* (2019.01); *G06F 16/9535* (2019.01); *G06Q 50/40* (2024.01)

(58) Field of Classification Search
CPC .................................................. G06Q 50/265
(Continued)

(56) References Cited

U.S. PATENT DOCUMENTS 8,533,485 B1    9/2013    Bansal et al.
8,677,139 B1    3/2014    Kalocsai
(Continued)

FOREIGN PATENT DOCUMENTS

CN           107209848 A    *    9/2017    ......... G06K 9/00073

OTHER PUBLICATIONS

Prosecution of U.S. Appl. No. 15/223,172 (US Patent Application Publication 2017/0032485), first named Inventor Arun Vemury.
(Continued)

*Primary Examiner* — Zeshan Qayyum
(74) *Attorney, Agent, or Firm* — Lavanya Ratnam; Robert W. Busby; Nathan Grebasch

(57) ABSTRACT

Collection, validation, accuracy checking, and matching of information for individuals, e.g., in-scope people entering/exiting a country is described. The systems, techniques, devices, methods, and approaches described herein can be used to collect biographic, biometric, and travel information for persons who enter a country with the expectation that the person will eventually exit. The system and method described herein include structures and procedures for determining whether the individual, based on his/her information, meets a predefined criterion that is associated with predefined procedures, e.g., special precautions are to be implemented. This document also describes how information for an individual can be matched with an existing record in order to ensure accurate recordkeeping.

42 Claims, 9 Drawing Sheets

US 12,073,482 B2
Page 2

Related U.S. Application Data

(60) Provisional application No. 62/221,436, filed on Sep. 21, 2015, provisional application No. 62/198,776, filed on Jul. 30, 2015.

(51) Int. Cl.
*G06F 16/9535* (2019.01)
*G06Q 50/40* (2024.01)

(58) Field of Classification Search
USPC .......................................................... 705/325
See application file for complete search history.

(56) References Cited

U.S. PATENT DOCUMENTS

| | | | |
|---|---|---|---|
| 9,560,165 B2 | 1/2017 | Liu et al. | |
| 2003/0055689 A1 | 3/2003 | Block et al. | |
| 2005/0167484 A1* | 8/2005 | Sussman | G07F 7/1008 |
| | | | 235/380 |
| 2006/0055512 A1* | 3/2006 | Chew | G07C 9/37 |
| | | | 705/13 |
| 2006/0293892 A1* | 12/2006 | Pathuel | G06F 21/32 |
| | | | 704/246 |
| 2007/0219801 A1* | 9/2007 | Sundaram | G10L 17/04 |
| | | | 704/270 |
| 2010/0138246 A1 | 6/2010 | Carey et al. | |
| 2011/0087888 A1 | 4/2011 | Rennie | |
| 2011/0211735 A1 | 9/2011 | Langley | |
| 2011/0231911 A1 | 9/2011 | White et al. | |
| 2012/0036071 A1 | 2/2012 | Fulton et al. | |
| 2012/0159600 A1* | 6/2012 | Takagi | G06K 9/036 |
| | | | 726/7 |
| 2013/0212655 A1 | 8/2013 | Hoyos et al. | |
| 2013/0262305 A1 | 10/2013 | Jones et al. | |
| 2013/0324086 A1 | 12/2013 | Celi, Jr. et al. | |
| 2014/0100895 A1 | 4/2014 | Chen | |
| 2014/0279640 A1 | 9/2014 | Moreno et al. | |
| 2014/0313007 A1* | 10/2014 | Harding | G07C 9/37 |
| | | | 340/5.52 |
| 2014/0363058 A1* | 12/2014 | Emmett | G06V 40/193 |
| | | | 382/117 |
| 2015/0063657 A1 | 3/2015 | Poder et al. | |
| 2016/0180078 A1* | 6/2016 | Chhabra | H04L 63/083 |
| | | | 726/19 |

OTHER PUBLICATIONS

Prosecution of U.S. Appl. No. 16/363,474 (US Patent Application Publication 2019/0220943), first named Inventor Arun Vemury.
Prosecution of U.S. Appl. No. 16/150,690 (US Patent Application Publication 2019/0043148), first named Inventor Arun Vemury.
Verifiable Credentials Use Cases, W3C Working Group Note Sep. 24, 2019, https://www.w3.org/TR/2019/NOTE-vc-use-cases-20190924.

* cited by examiner

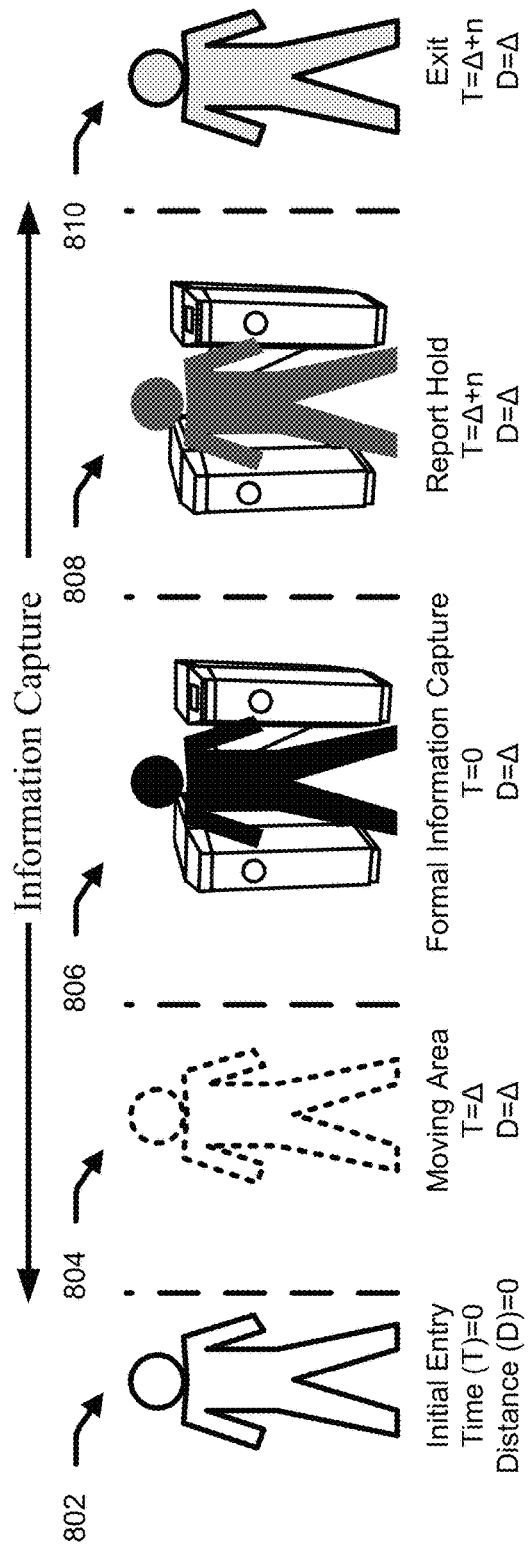
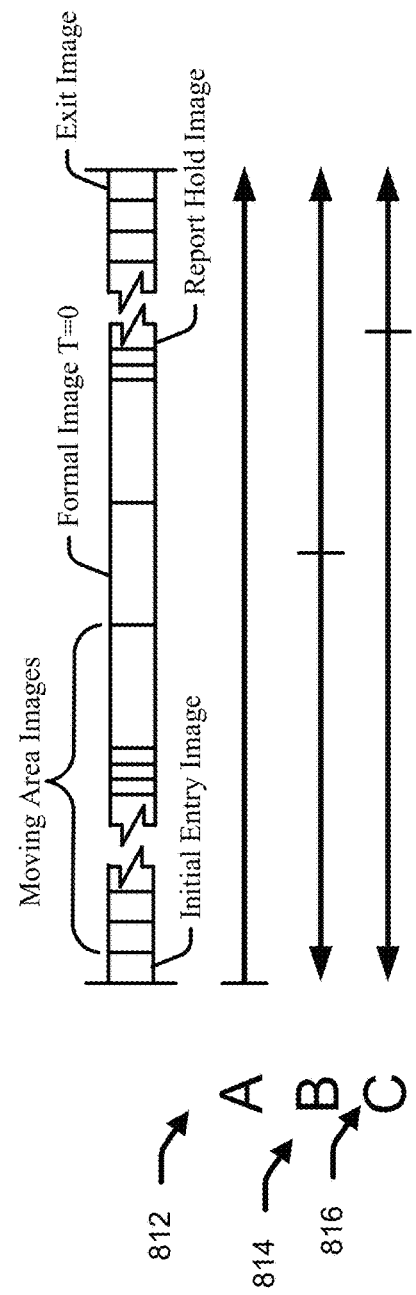

SELECTIVE BIOMETRIC ACCESS CONTROL

CROSS-REFERENCE

This application is a divisional in accordance with 35 U.S.C. § 121 and claims priority to U.S. patent application Ser. No. 15/223,172 filed Jul. 29, 2016, entitled "Identity Verification System and Method" which claims the benefit under 35 U.S.C. § 119(e) to U.S. Provisional Patent Application No. 62/198,776, filed on Jul. 30, 2015 entitled "Identity Verification System and Method" and U.S. Provisional Patent Application No. 62/221,436 filed on Sep. 21, 2015 entitled "Identity Verification System and Method," all of which are hereby incorporated by reference in their entireties.

GOVERNMENT RIGHTS

This invention was made with United States Government support. The Government has certain rights in this invention.

FIELD OF THE DISCLOSURE

This application relates to collecting identifying information, matching, and identifying individuals based on collected information. Embodiments are described that are useful for entry/exit screening individuals (e.g., people) entering/exiting a country. In embodiments, one or more databases are used to collect, store, and access information, such as biographic information, travel and bio-identification information, to identify individuals.

BACKGROUND

Large numbers of people routinely cross international borders each day. Some statistics indicate approximately one million individuals pass through United States (U.S.) Customs on a daily basis. Customs officials, such as U.S. Customs and Border Patrol (CPB) Officers, not only have the responsibility to check the identities of these individuals, but also interdict illegal merchandise, drugs, weapons, etc.

Persons entering/exiting the U.S. are categorized as being in-scope or out-of-scope. In-scope and out-of-scope individuals are handled in different ways. For instance, an in-scope individual may be screened differently than that of an out-of-scope person.

Out-of-scope individuals include U.S. citizens, permanent residents, diplomats, and so on. In-scope individuals include foreign visitors, and those who are not "out-of-scope." Categorization of persons as in-scope or out-of-scope is done in-part because in-scope individuals are scheduled to depart the country, e.g., when his/her visa expires, while out-of-scope persons are exempt (e.g., diplomats) or are citizens who have a right to enter the country.

Customs officials, e.g., CBP Officers, are responsible for determining whether individuals can properly enter the U.S. While non-citizens from some countries are permitted into the U.S. without a visa due to an agreement between the U.S. and the non-citizen's country of residence/nationality, other non-citizens are required to obtain a visa to enter the U.S.

For example, Jan Jorgenson, visiting the U.S. from Europe, may undergo different screening procedures than a U.S. citizen, a permanent resident, or a diplomat when entering the U.S. by air. This partly may be done because Jan is anticipated to exit the U.S. once his trip is over, such as in three weeks after having visited Mount Rushmore, Teton, Yellowstone, Glacier National Park, Acadia, and Shenandoah National Parks.

CBP, as part of its duties, maintains records in order to enforce U.S. laws and help state, local, and tribal officials fulfill their missions. For example, CBP may locate a suspect in state criminal matters as part of boarder screening. Well-maintained records help maintain national security. Customs related records, can be used to prevent terroristic activity associated with non-citizens entering a country, such as the United States illegally or under false pretenses.

SUMMARY

Collection, validation, accuracy checking, and matching of information for individuals, e.g., in-scope people entering/exiting a country is described. The systems, techniques, devices, methods, and approaches described herein can be used to collect biographic, biometric, and travel information for persons who enter a country with the expectation that the person will eventually exit. The system and method described herein include structures and procedures for determining whether the individual, based on his/her information, meets a predefined criterion that is associated with predefined procedures, e.g., special precautions are to be implemented. This document also describes how information for an individual can be matched with an existing record in order to ensure accurate recordkeeping. This document further describes routing individuals through an evaluation process and construction, operation, and maintenance of a massive biographic/biometric data system. Additionally, configuring and operating a biometric information handling system in a generic manner is described. Embodiments of biometric matching systems that operate agnostically of components with such systems that implement proprietary technologies are also described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features.

FIG. 8A is a graphical illustration of an individual entering, proceeding, screening, and exiting an area that implements biometric matching, such as facial recognition screening.

FIG. 8B is a graphic illustration of biometric information capture, such as that described in conjunction with FIG. 8A. Example approaches for biometric information selection are also illustrated.

DETAILED DESCRIPTION

Overview

Figure 1:
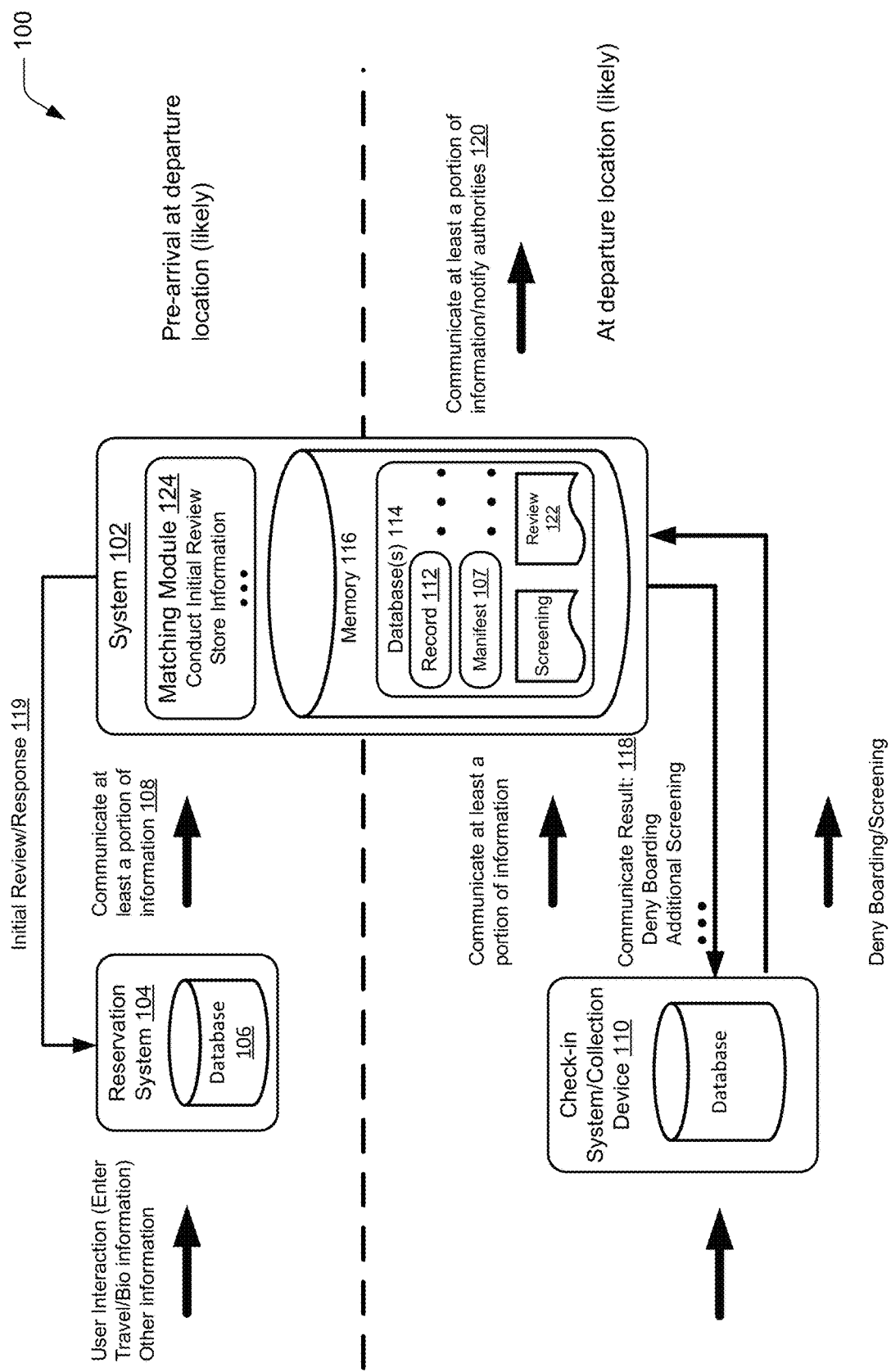
FIG. 1 illustrates example (other) systems, and accompanying data-flows, illustrating interactions with a system in accordance with the present disclosure.

Collecting, maintaining, and matching records to identify individuals entering and leaving a country is a daunting and time consuming task. Take for example, a scenario in which approximately one million people enter or exit a country on a daily basis. Presuming an equal number of persons enter and leave on any given day, at the end of even a short period, matching a person leaving the country with his or her entry record may involve matching him or her to one of several million records. This can make it difficult to identify individuals. This scenario ignores out-of-scope persons who are handled in different ways.

Data systems and in particular data systems that handle massive numbers of transactions on a routine basis impose unique challenges (e.g., processing challenges, procedural challenges, hardware constraints) that do not manifest themselves in comparatively smaller systems. For example, the challenges do not scale in comparison to data systems handling tens of thousands transactions on a daily basis. Example massive data handling systems handle on the order of one-hundred thousand to one million, about one million transactions, or several million transactions on a daily basis. These transactions can include biometric and biographic information handling.

Further complicating matters is the fact that customs facilities operate in different time zones, some facilities are in different countries, and facilities have a wide variety of configurations. Examples of the latter situation are airports that lack space or have configurations that do not accommodate efficient screening. Screening is problematic as large numbers of individuals usually arrive at approximately the same time. Monday mornings and Friday evenings, for example, are times at which airports experience a large influx of persons who are to be screened in a short time period.

Another challenge in operating a data system handling identification type tasks, is that biometric information (e.g., facial recognition data, fingerprint data) can be extremely large, in comparison to biographic information (e.g., passport information, flight information). Facial recognition data, for example, may be several to tens of megabytes in size while biographic information is tens of kilobytes in size. As a result, there may be an asymmetry in file size between biometric and biographic information. While a signature of the biometric information, such as a hash of an image, can be used to minimize the size of the information, handling, storing, processing, communicating biometric information raises unique challenges. As is to be appreciated, hardware included in such a system also has to accommodate these issues. Additionally, the use of biographic information may be emphasized to minimize the computational and communication burden associated with biometric information. In some instances, the systems, methods, techniques and approaches described herein dynamically adjust based on discrepancies in biometric and biometric information, a change in predetermined threshold, and so forth. For example, the system may specify a higher level of facial recognition when, for example, a captured fingerprint image is of poor quality. In another example, biometric data collection and identification threshold are increase based on biometric information, e.g., an individual is biometrically screened to a higher degree in comparison to an average individual because he/she is using a new passport.

An additional challenge with biometric information is that commercial vendors implement proprietary identification algorithms, data formats, and so on that pose integration concerns, particularly for systems that implement biometric information from a variety of suppliers, data formats, and identification algorithms. The systems described herein can be designed and operated to genericize data so the system operates in an agnostic manner. For example, a central resource maintains biometric information in a generic format that is different from a format used by a device to capture an image or derive information from an image.

In this manner, the "back-end" portion of the system operates in an agnostic manner, e.g., without regard for the technology (algorithm, data format, etc.) implemented by end user portions of the system, e.g., kiosks, access control devices, workstations. A system configured and operated in this manner can permit the system to dynamically adjust based on a variety of factors including, but not limited to, changes in threat level, differing levels of identification, based on biometric dynamic thresholding, and so on. The foregoing can be applied in a manner to apply different procedures, levels of review, and so forth while maximizing overall throughput. Additionally, the system can be configured to conduct biometric identification, such as facial image matching, agnostically or in a proprietary manner. For instance, matching can be performed using generic data or the generic data can be used by a proprietary algorithm (e.g., a non-generic algorithm). It will also be appreciated that the system, or a component thereof, can capture, store, compare, identify, maintain information, whether biometric or biographic, in form that contains less than all the information. Example systems and methods use a signature that is indicative of the image, such as a hash of the image, a compressed version of the image or a portion thereof (e.g., information that is indicative of the image to a predetermined level).

In order to minimize passenger delay which can lead to dissatisfaction and potentially a negative perception in the mind of people traveling, it is a virtually necessity that individuals are identified in an efficient manner to minimize dissatisfaction and ensure accurate records maintenance. For example, while identification and records management are performed to a predefined threshold to ensure integrity, the system can be configured to apply additional scrutiny based on a variety of factors, such as recently issued or replaced biographic documents, biometric identification issues (e.g., poor fingerprints), heightened scrutiny levels, and so on. Data integrity issues can arise as an individual may leave through a large number of facilities, multiple people with similar biographical or travel documentation may leave at approximately the same time, or biometric information and/or identification is based on a poor image capture (e.g., facial recognition is based on an image that is at or near tolerance). Another complication is that people routinely lose travel documents, change names, and so forth.

Matching an individual exiting a country to his or her entry record is important as it is the last point at which the person is physically within that country's jurisdiction. For example, inadvertently confusing two individuals with the same name can create inconsistent records, raise issues when the later to exit person attempts to leave the country. Other scenarios that highlight the importance of maintaining accurate records include a person attempting to illegally use another person's identity or switching identities, e.g., using travel documents with different identities to enter and leave the country. In other examples, individuals may surgically alter his/her appearance for benign reasons or to permit him or her to improperly use biographic information, such as a stolen passport.

Although this application discloses embodiments, implementations, and scenarios involving customs records management, it should be understood that the principles of the present disclosure are applicable to a wide variety of situations and environments. The techniques, approaches, software, firmware, hardware described herein may be utilized where information is managed, collected, exchanged, vetted, or otherwise compared. Other situations that can benefit from this technology include, but are not limited to, customer check-ins, vehicle registrations, driver license registrations, permit collection (e.g., building permits), identification of individuals, correctional institutions settings, massive data systems (whether containing biometric and/or biographic data) and the like. In situations, the techniques, approaches, concepts, software, firmware, and hardware described herein are implemented to obtain, identify, store, check, verify, authenticate, and match information for individuals. Example information includes, but is not limited to, biographic, travel, biometric, information and a unique identifier that associates such information, e.g., a bar code, record locator (a record "number"), etc. It is the intention of this document to encompass and include such embodiments.

In the discussion that follows, a section "Example Data Flow" describes how information can be handled and passed to effectuate accurate information matching to ensure accurate recordkeeping for substantially all in-scope persons who enter a country. As is to be appreciated, methods, data flows, techniques, approaches, and devices and software implementing these can be designed and operate to accommodate a massive number of transactions per unit of time, e.g., on a daily basis. While example data flows are described in conjunction with biometric data, it should be appreciated that data systems that operate in an agnostic manner and/or are involved in massive number of tractions and/or handling information that in total comprises a large size can benefit from the present disclosure. After that, a section entitled "Operating Environment" describes but one environment in which the various embodiments can be employed. Following this, an "Example Methods" section describes how accurate information matching to ensure accurate recordkeeping can be achieved. While the systems, hardware, software, techniques, methods, and approaches are described in relationship to particular implementations the underlying principles disclosed herein can be combined, adjusted, or manipulated as contemplated by one of ordinary skill.

Prior to describing an example operating environment, further information is provided regarding how the systems and environment are impacted by other systems, processes, and so on 100. With reference to FIG. 1, an individual, e.g., person, prior to interfacing with a system 102 in accordance with the present disclosure, interacts with other systems that in-turn interact or are communicatively interconnected with systems or components of systems encompassed by the present disclosure.

For example, an individual that is in-scope may establish a reservation with a common carrier via a reservation system 104, e.g., a computer system configured to accept travel arrangements. Example common carriers include, but are not limited to, airlines (air carriers), train lines, ship or cruise lines, bus lines, automobile transport services, and so forth. In this scenario, the individual enters or can be assigned travel information that is shared, forwarded, used as a point of comparison, and combinations thereof for the system 102, methods, techniques, and approaches implemented by the present technology.

For example, an in-scope individual, Jan Jorgensen, makes a reservation to travel from Stockholm, Sweden to Denver Colorado's Stapleton International Airport using an airline reservation system 104 constructed to facilitate purchase of an airline ticket and related matters. For this example, Jan is a citizen of a European country that is permitted to travel to the U.S. without the need for a visa. Thus, Jan may not directly interact with customs or embassy officials or supporting systems until he arrives for departure. The information input by Jan, or on Jan's behalf, in addition to information provided by the airline reservation system, can be entered into a database 106 for the reservation system.

In some instances, such as with Jan's permission, information associated with the individual (e.g., Jan's name, age, gender, citizenship, and so forth) is communicated to the system 102. Although the information can be forwarded independently, e.g., as information solely related to Jan, in other instances the information, or a portion thereof, is communicated with information of other individuals being transported by the common carrier, such as in a flight manifest. As illustrated the system stores information from the manifest in a manifest record 107 in database 114, such as a manifest database. In other instances, Jan's information is communicated with that of others in Jan's travel party or with information of individuals of the same type or class. An example of the former is communicating Jan's information with that of family members traveling with him. An example of the latter situation is communicating Jan's information with that of others on an "enhanced review," presuming Jan's information qualifies him for this status.

An individual's information, in embodiments, is transmitted 108 to the system 102 prior to that person being interviewed by a customs official even though the interview occurs in a location from which the individual is departing, e.g. Stockholm Sweden for Jan. While the system can receive the information at any time prior to arrival, in embodiments at least a portion of the individual's information is transmitted at or approximately at seventy-two (72) hours before expected arrival/screening. In other instances, information is transmitted at or approximately at twenty-four (24) hours before arrival/screening.

In other embodiments, information is communicated at various times depending on a variety of factors. For example, information for an individual who is apparently not authorized for travel, is authorized for travel with pre-established precautions, or the like is communicated at different times. Information for an individual who (apparently) is not permitted to travel to his/her destination country can be communicated further in advance of information for others that is transmitted at a later point in time.

The information can be communicated multiple times in situations where the system 102 performs multiple reviews, information is updated, and so on. This can permit the system 102 to select individuals corresponding to different classifications, at various times and/or account for data updates, travel cancelations, or changes that can occur up to screening or boarding. For example, information for persons purchasing only one-way tickets, paying cash, paying by a debit card not associated with an identity, purchased at "the-last-minute", and the like factors that can indicate specific behaviors and may be forwarded to the system 102, prior to communicating information for individuals that are not in one or more of these categories and/or handled via different procedures.

The information so far provided could be approved, authenticated, and/or validated, such as by using the reservation system 104 to associate the information with a token, e.g., an identity token like a passport, in other instances the information is communicated without this having occurred. An example of the latter situation is an individual who merely provided biographic information that is not associated with a token. For example, the traveler fails to provide a passport number associated with a passport that uniquely identifies himself/herself. Other example tokens include identification tokens such as a driver's licenses, identification credentials, and the like.

In embodiments, the biographic information (e.g., travel information) is included in a particular format, e.g., a record, illustrated as record 112 stored in a database 114 in memory 116. This format can be the same format, or a colorable version of a record format used by the system, e.g., in a format that facilities data extraction or is forwards/backwards compatible with a record format implemented by the system 102. For example, the information is encoded in UNICODE (Unicode Consortium, Mountain View, CA) text format and/or in a particular file format, such as comma delimited file format, also known as comma separated file format or values (CSV). The reservation system, in this case, can provide a colorable version by communicating at least some of the information in a format that identifies the data contained therein to the system 102.

For example, the information provided by the reservation system complies with extensible markup language (XML) format, a variation thereof, or a like schema, so the system 102 can identify the information based on its defined properties, e.g., XML tags. For example, the name "Jan" has the property of given, or first name, while "Jorgenson," Jan's last name, has the property last name, or surname. Thus, the system can parse the information into the proper fields in order to make the information usable by the system, minimize the individual's time, and streamline the overall process. The system 102 can implement a variety of protocols to support populating information into a particular structure, e.g., an entry record.

Metadata can be included with the information in order to describe the information. Example metadata includes, but is not limited to, payment method, trip type (e.g., one-way), time of purchase, amount of time prior to trip, location/area where the travel was purchased, IP address of computing device used to make purchase, carrier reward number (frequent flyer number), data entry time, validation checking results (e.g., nature of errors made). Other metadata includes language used by interface used to consummate purchase, ticket delivery, subsequent travel changes/updates, information regarding other persons in travel party, seat preference, meal preference, purchase history, visa duration, visa issuing location, biometric information, and the like information. Information provided as metadata also can be included itself as other data, e.g., the metadata is included itself in a record 112.

Also, other information can be included with the biographic, e.g., travel information. For example, a unique record identifier or session identifier is added to the individual's information to identify one or more transactions that gave rise to the information. A common schema can be implemented between the reservation system 104 and the system 102 to substantially ensure security, permit time stamping, identify different versions of the data, and so on.

In some instances, information received by or generated by the system 102 is returned to the reservation system 104 or another system that communicates with the system 102, communicate result 118. A similar type communication to the reservation system is denominated as 119. An example other system is a check-in system 110 operated by a common carrier, a travel facility (e.g., a terminal or airport), a law enforcement, customs, or a computing system operated by some other governmental entity.

For example, responsive to the system 102 determining that Jan is not to board his flight, he receives a notification via the airline check-in system 110 of this decision. Such a notification can be sent to a collection device, to a computer system for a law enforcement entity 120 (e.g., a fixed or mobile device), a governmental entity, a travel facility, a smart phone (e.g., Jan's mobile telephone), combinations thereof, and so on in addition to or in place of notifying an airline check-in or reservation system 102, 110 in further examples. In other instances, the system 102 originates the message.

In some instances, a notification 118 provides additional information or instructions. For instance, responsive to an initial review, the system can provide visual or audible instructions recommending additional screening provide or a suggestion in a notification. Although the individual can be directly notified, e.g., by a kiosk system, in other instances the information is communicated to customs officials (via a computer system) for one or more of a departure country 120, an intermediate country through which the individual will pass, or to customs officials for the destination country, e.g., to a computer system configured to support customs officials for the destination country that are physically located in the departure country. The foregoing situations and protocols will be discussed herein below and/or apparent based on the following descriptions.

In other embodiments, another system (e.g., an airline reservation or a check-in system) initially classifies an individual as "in-scope" or "out-of-scope". Although the foregoing can be performed based on the information provided by the person (e.g., based on inferential information) or by information provided by the common carrier, in other embodiments it is done based on the person's input, such as user inputting that he/she is in or out of scope, or direct information.

In additional embodiments, the system 102 performs an initial determination of whether the individual is in-scope or out-of-scope and/or performs a determination whether the individual is in-scope or out-of-scope. Examples of the latter scenario include a single determination or iterative determinations. The foregoing iterative determination may be performed a predetermined number of times, until a threshold is met, a determination is made that a predetermined threshold cannot be met, and so forth. It should be appreciated that other iterative process described herein can be performed in a similar manner. Although not restrictive of the following environment, the foregoing may be useful in understanding the environment 200. This determination can be part of an initial check of information, e.g., a review for accuracy and/or validity.

In some instances, the system 102 communicates at least a portion of the information to additional systems (a law enforcement system as illustrated as 120). The determination whether to alert others (e.g., law enforcement) can be based on a variety of factors and accomplished using various approaches, techniques, and methods. For example, the system 102 uses a lookup table or other computing structure to determine whether information associated with the individual meets a predetermined criterion, and if so what action is to be taken (illustrated as review 122).

For example, the system 102 uses a look-up table, such as may be stored in memory 116, to determine that a person who is in-scope and has a name that is an alias for a criminal (although not necessarily the criminal). In this case, the system 102 instructs that the individual be asked for additional forms of identification, e.g., by a check-in system 110. A matching module 124 such as a program can be used to determine whether a match exists between the person's information and that associated with a particular action. A matching module 124 as described below can perform such tasks. Other example actions include, but are not limited to, detain, prevent from traveling, "take additional precautions," restrict mode of transportation, and so forth, and combinations thereof.

These actions can be provided as prompts, such as pop-ups, email messages, instant messages, audible (e.g., voice) message, and so on that are communicated via a variety of methodologies (e.g., cellular, wireless (802.11-type specification), a wired network or combinations thereof. For instance, a customs officer that is to perform a primary interview receives a visual, audible, or tactile prompt at his/her workstation via a computer system such as a mobile device.

It is to be appreciated that a variety of algorithms can be used to determine whether one or more factors provides sufficient basis as to whether a criterion is met. Example algorithms are based on predictive or descriptive modeling, probabilistic modeling (e.g., risk modeling), and so forth. In embodiments, the system 102 employs one or more analytical techniques, use of an algorithm, modeling technique, etc., to perform this determination. In some embodiments, these algorithms are embodied in the matching module 124, e.g., a computer readable code that causes the matching module to perform this determination.

Additional reference will be made to FIG. 1 to explain structures, methods, systems, components, concepts of operation, and so forth that are relevant to, but not restrictive to the environment 200.

Operating Environment

Figure 2:
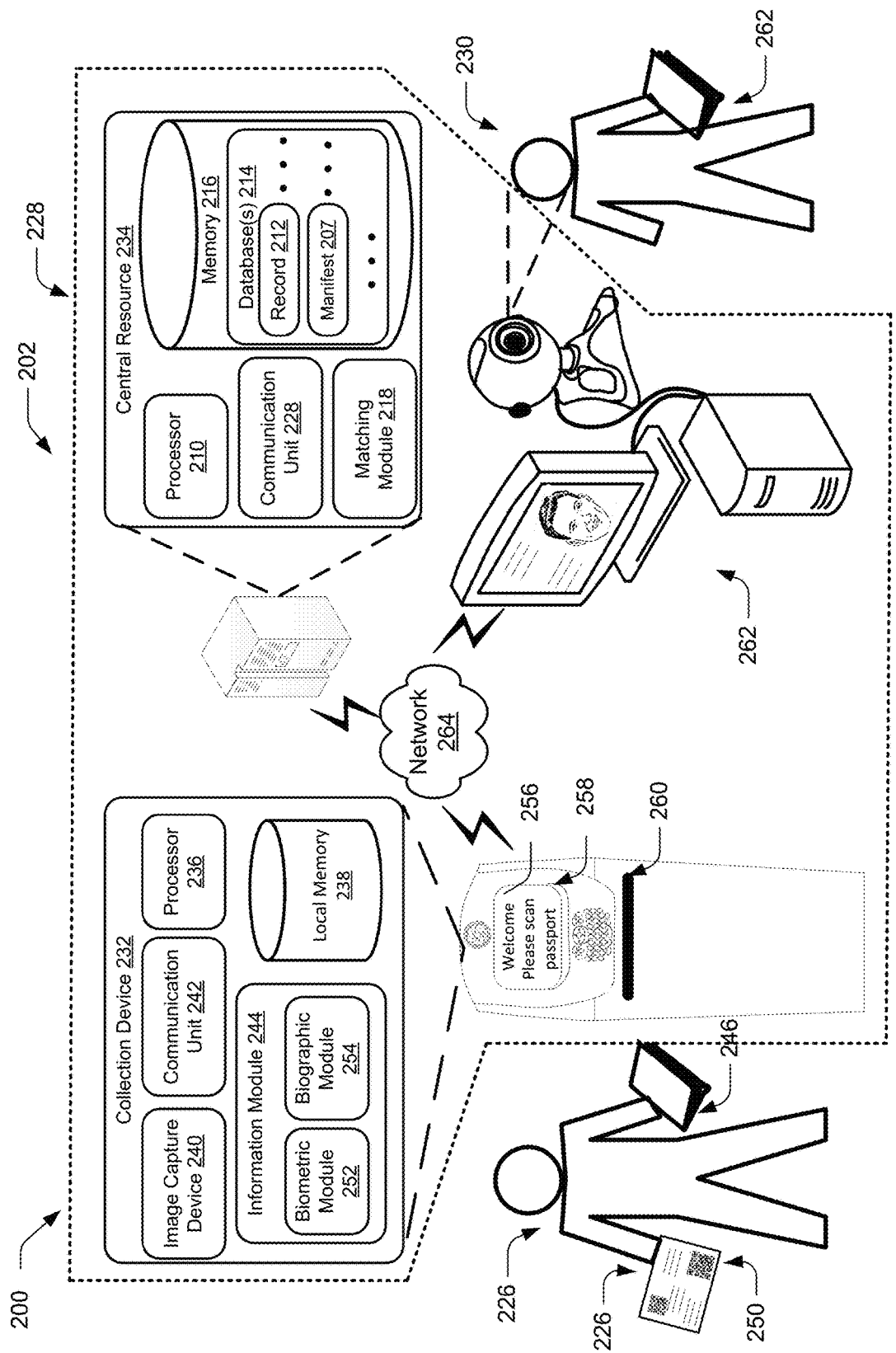
FIG. 2 illustrates an operating environment in which the inventive principles can be employed in accordance with one or more embodiments. Although the accompanying description describes interactions with the other system of FIG. 1, it is not to be taken as a requirement that the system interact with another system.

FIG. 2 illustrates an operating environment 200 in accordance with one or more embodiments. To better understand the principles of the present disclosure and solely for the purpose of explanation only, continuing reference will be made to an individual 226 who is passing through United States of America (U.S.) Customs, e.g., Jan Jorgenson. With continued reference also to FIG. 1, systems, such as system 202, in accordance are now further described. Although a dashed boundary 228 is included to aid in understanding, it is to be understood that various components within the system 202 can be varied, substitute structures and so forth can be included in place of or in addition to those described. Furthermore, as some of the components are mobile or serve other purposes (e.g., embodied as an application supported by computer implementable instructions), components can join/leave the system 103 based on use. The components remaining in the system can be dynamically reconfigured based on the resources that remain in the system.

In this scenario, for the purpose of explanation only, an individual 226 is being screened as part of his vacation to the U.S. The individual 226 will also be screened as part of exiting as described, illustrated as 230. For the purpose of this example, the individual (Jan) is an in-scope, he will be screened according to predetermined processes. As illustrated, the individual inputs biographic information to, for example, a collection device 232 configured to collect biographic and/or biometric information associated with the person. Example collection devices include, but are not limited to, kiosks, mobile telephones/smartphones, laptops, computing systems (operated by one or more of airlines, travel facilities, a governmental entities, law enforcement), a wearable computing system, an access control device, combinations thereof, and so on.

An example of collection devices acting in combination is an individual collecting some information on his/her smart phone before wirelessly communicating it to a kiosk to complete information entry. In another example, biographic, biometric, and/or travel information is communicated from a smart phone by optically scanning a barcode, output on an included display, encoding the information with a scanner on the collection device. In other instances, information is communicated to the central resource 234 and scanning or wireless communication between, for example, a smart phone and a kiosk is used to access the information in memory.

Additionally, the collection device 232 can collect travel information, e.g., flight number, airline, visa number, seat assignment, meal preference, payment method, traveler information (frequent flyer number), and so forth. For example, the collection device 232 collects travel information from an airline reservation system responsive to a person scanning his/her boarding pass with an optical scanner like a barcode reader.

In some embodiments, a mobile device that functions as a collection device and/or the central resource 234 coordinates or marries information provided by another system with information provided by the individual, e.g., input directly by the person or by the individual scanning his/her boarding pass, passport, driver's license, credit card, smart phone, debit card, visa, travel document, or a combination thereof. For example, the central resource 234 combines information provided by the individual with historic information, e.g., biographic/biometric information from a previous trip or enrollment. The information can be included in a record 212 associated with a unique identifier, e.g., a record including entry information as described above.

As illustrated, the collection device 232 includes a processor 236 and memory 238. An image capture device 240 (e.g., a camera) and communication unit 242 are also included. Although a single processor 236 and memory 238 are shown, multiple processors and memory can be included. A wide variety of types and combinations of memory may be employed, such as random access memory (RAM), hard disk memory, removable medium memory, and other types of computer-readable media.

As further illustrated, the collection device 232 includes an information module 244. The information module 244 is representative of functionality to collect information.

Although operation of the information module can be accomplished by hardware, as illustrated the information module 244 comprises a program of instructions that collect or otherwise facilitate the collection of information. Information can be collected directly, such as by typing in information, scanning a fingerprint, iris, or capturing an image of a person's face.

The information module 244 can collect information indirectly. For example, a user may scan a passport 246 or a travel document 248. In the foregoing example, the information collects the information that is coded directly in, for example, a machine readable unique identifier, or a bar code 250 directs the collection device 232 to a source of the information. In other instances, information is indirectly input by typing a unique identifier in a text box so the system 202 accesses a record in the database 214 on the central resource 234 and/or on another system, e.g., a common carrier reservation or check-in system (104, 110). For example, the information module uses a machine readable scanner to access information in memory 216 on the central resource 234.

Scanning can comprise optical scanning (e.g., machine readable optical scanning, such as a barcode output on a display of a smart phone), magnetic scanning (e.g., reading a magnetic strip on a credit or other card), scanning a radio frequency identification (RFID) tag or chip, ultrasonic scanning, capacitance scanning (active or passive, near-infrared scanning, a combination thereof, or the like.

Example information includes biographic information, biometric information, travel information, and so forth. For ease of understanding, the information module is illustrated as containing a biometric module 252 and a biographic module 254 that, respectively, are capable of collecting biometric information and biographic information for an individual. The information module can be constructed to support one or more graphical user interfaces (GUIs) 256 that are output on a display 258 included in the collection device 232 for accepting user input. For example, the information module 244 includes an application program interface (API) that allows it to collect an image captured by the image capture device 240, e.g. a digital image camera. Example images include but are not limited to an image of a person's face, an iris image, an image of a fingerprint or multiple fingerprints.

In further examples, the information module 244 collects information from one or more other devices that directly or indirectly collect information. As illustrated, the information module 244 is configured to support an optical scanner 260 by collecting information encoded into for example a barcode or by accessing a resource to collect information and/or to direct information for collection by another resource, e.g., memory 216. An example of the foregoing, is the information module 244 accessing a remote database, e.g., a reservation database, to obtain biographic information associated with a barcode in a passport.

In embodiments the information module 244 is embodied as program of instructions, e.g., an application that is stored in memory until accessed, e.g., launched. For example, the instructions embodying the information module are included in one or more computer-readable storage media, such as tangible media, that store the instructions in a non-transitory manner. In embodiments in which the information module 244 interacts with physical and/or software components, the information module is configured to interact via an API to access the information.

In examples, the biographic module 254 accepts information input directly to the collection device, e.g., user inputs, such as keyboards, touch screen displays, mice, gesture detectors, microphones enabled with voice recognition software, and the like that accepts biographic and/or biometric information. In this instance, the information module 244 generates a graphical user interface (GUI) 256, supported by a program of instructions, output on a display 258 that permit an individual, e.g., the user, to enter information.

The information module 244 can include validating functionality, e.g., a script or program of instructions that validates the information, that is operable to implement rules for validating information, such as in response to entering information via a keyboard. Example information includes biographic, travel, and/or biometric information. In embodiments such as this, the validating function can be embodied as an algorithm that weighs the information to determine its validity. For example, instructions that enable the information module implement an algorithm that compares a name entered via a keyboard with that maintained in memory, e.g., memory, for a corresponding passport.

The validation rules can be used to check for inconsistencies, errors, omissions in names, addresses, flight numbers, a description of goods/articles is accurate/falls into a pre-established category, responses to yes/no questions, and so on. Examples of validation rules include but are not limited to, a specified number of digits, a number pattern, and the like. The information module can validate biometric information by for example checking to ensure a picture of the individual's face is present, a fingerprint has been captured, an iris scan is collected, and so forth.

The information module 244 can implement biometric validation in a similar manner. For instance, the biometric module 252 is enabled with code that checks a fingerprint to determine that all or enough of a fingerprint is present to permit matching/identification based on a captured fingerprint. In the previous example, the computer code performing the validation can analyze the fingerprint using one of several classification systems, including but not limited to, an algorithm based on the Vucetich system, the Roscher system, the Juan Vucetich system, or the Henry System. In embodiments such as these, the biometric module implements an algorithm that assesses the quality of the biometric information. For example, the biometric module includes a quality algorithm to determine if a facial image is of sufficient quality to be used for matching. In some instances, the biometric module may select from multiple images to determine which, if any, is of sufficient quality to be used.

In embodiments, validation can be triggered by an event. Example events include entering text, checking a box or button, browsing to a new page or display, selecting enter or save, responsive to an event (e.g., a user entering a "mantrap"), and so on.

The information module 244 or a validation module, if used, includes validation rules for different countries, languages, information text boxes, and so on. Example validation rules can include rules for names, addresses, dates, passport numbers, flight numbers, a description of goods, personal characteristics, responses to yes/no questions, biometric information inputs, and combinations thereof. Examples of validation rules include but are not limited to, a specified number of digits, a number pattern, and the like. The validation module or information module, if it is performing this role, can include a result table (stored in memory) that is configured to store validation records. Validation records in embodiments include data associated validation errors, successes, information correction (e.g., correction of a city name), and the like for an event that triggers validation. Thus, as text is entered, the data validation logic can validate each entered character for an event, e.g., key press, submitting or storing information. The system 202 (e.g., collection device and/or central resource) can maintain the validation records for a predetermined period of time, until occurrence of an event, and the like events. It will be appreciated that this information in the validation record may be included in a name record and/or an indication (such as a score) can be included. In the latter situation, a score may indicate the person or persons are attempting to provide false or misleading information. What threshold score is to be achieved to pass validation can be changed manually, e.g., by a system supervisor, or dynamically based on a variety of factors, including but not limited to, location, other users' errors, and so forth.

Although validation has been described in combination with the information module on the collection device, in other embodiments the central resource performs this functionality, or a more robust/different form of validation/checking or it can be performed in a distributive manner. In further embodiments, validation is performed by a dedicated module on the collection device. In the previous example, an API is used to allow the information and verification modules to interact.

The code included in the information module or the validation module, if one is included, can be configured to perform additional functions, such as translating text. For example, the validation module contains validation rules that check whether a user's response is in a language that is not officially accepted by the system 202. The validation module 202 may do this based on a user input, e.g., a language selection, existence of a particular Unicode character in the information, comparing information to dictionaries, or the like.

As illustrated, the collection device 232 includes an image capture device, e.g., a camera, although other devices, scanners (e.g., an iris scanner), detectors can be included with or used in place of a camera. The image capture device 240 is operable to capture biometric information. For example, a user implements a camera in a kiosk to capture an image of his/her face for inclusion with his/her biographical information. Other biometric information includes, a fingerprint image, an iris scan, a body scan and/or actions associated with behavioral traits, voice pattern, walking gate, and the like biologically identifiable traits. In the picture situation, the image is embodied in a file for inclusion in custom information sent to the intermediate. The image may be contained in a variety of file formats including, but not limited to, a jpeg file, a tiff file, a gif file, a pdf file, and so forth. As will be discussed in greater detail below, image capture can include capturing a video or multiple images and down selecting a particular image using an algorithm to select an image that meets or exceeds a quality threshold, e.g., is suitable for biometric identification.

As illustrated, the collection device includes a communication unit. The communication unit represents hardware and/or software (e.g., firmware) for communicating with other devices/components in the system, external resources, such as other systems, and the like. The communication module can implement a variety of communication technologies including, but not limited to, wired, wireless communications and combinations thereof. Wired embodiments include communication systems implement Internet protocols, e.g., transmission control protocol (TCP) over internet protocol (IP), fixed or hardwired telephony communications.

Wireless communications include but are not limited to BLUETOOTH (Bluetooth SIG, Kirkland, WA), by an 802.11 compliant communication link implementing a receiver/transmitter, a cellular compliant transceiver that is compliant with a commercial cellular standard (4G, 4G LTE, 3G, 5G). An example 802.11 compliant system is a system compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York.

At least some of the information can be obtained from one or more other systems. For example, upon scanning a travel ticket or other travel document, the system obtains information from a computing system for a common carrier, encoded into the ticket (e.g., encoded in a barcode), from the individual himself/herself or from a representative of the individual. The information or a portion thereof may be retrieved responsive to the scanning or other request, the information or a portion thereof can be already accessible, such a via a network connection, from remote memory (e.g., central data storage). For instance, responsive to scanning a bar code output on a smart phone, an application on the smart phone can cause it to provide information stored in local memory or that otherwise accessible to the smart phone, e.g., user profile information. The user can permit this to happen by clicking on an "I accept" icon output on a display.

At least a portion of this information (biographic, biometric, travel) is historic information in embodiments in accordance with this disclosure. Historic information comprises information that is sufficiently prior in time to a current transaction or transaction so as to indicate it has particular importance or relevance. For example, historic information has been verified or is deemed accurate due to the passage of time. Confirming a person's information matches that used five years prior (such as without incident) can be more probative than the same information used within the previous month. Thus, the system, e.g., the central resource, in making a determination can weigh historic information more heavily than that of recent information.

One example of another system, from which the system 202, can obtain information is described in U.S. patent application Ser. No. 14/487,598, entitled "Mobile Application," filed on Sep. 16, 2014 which is assigned to the Government of the United States of America as represented by the Secretary of the Department of Homeland Security. The entirety of the foregoing application is incorporated by reference in its entirety.

In other instances, the information or at least a portion of the information is already on the system 202, e.g., memory. For example, biographic information, including travel information for storage includes in the central resource prior to the individual scanning his/her passport, travel ticket, license, credit or debit card, or the like token that identifies the individual. The system 202 may have already conducted a review, or an initial review, of at least some of the information for the individual. For example, the system 202, e.g., the central resource, initially reviews the information or a portion thereof to determine whether an individual is permitted to fly into the country, has a criminal past or has a pending charge, should be subject to particular procedures (e.g., additional screening, routine screening, minimal screening, screen associated physical objects, asked particular questions). The system's review can be conducted based on a variety of information in the biographic or travel information.

An initial review of the information is conducted contemporaneously with a determination or initial determination that the individual is in-scope in embodiments. For example, the central resource, in addition to determining a person is in-scope, determines what procedures to implement for the person based on biographic or travel information. In another example, the central resource routes the individual for minimal screening as the determination and initial review indicate the person is out of scope and unlikely to pose a risk.

In other instances, the system 202 routes the individual based on the information. A person who is likely to speak a particular language, e.g., German, can be routed to a customs official with a corresponding language ability. For example, the matching module 218 determines that an individual likely speaks German and routes him/her to a customs officer identified in a skills database as having this capability. Other examples include, but are not limited to, routing individuals based on a cultural sensitivity, e.g., a female is routed to a female customs officer, behaviors, and so on. The foregoing routing can be based on a presumed or expressed preferences.

The system can be configured to impact variety of information based factors and situational factors can be implemented when determining where, when, how, to what extend or level of rigor screening is to occur. For example, an individual with an earlier departure time is routed to a station where the wait time is lower in comparison to a person who has a later departure time. In another instance, a person is routed to aid law enforcement activities. For example, individuals in a traveling party are routed to different stations so officials can interact with one person out of the immediate presence of one or more other members of the party. The system can be configured so such decisions appear to be random, e.g., people in other travel parties adjacent the travel party of interest are directed to different stations to minimize the likelihood that persons in the party of interest detect the underlying goal.

Further description of how the system can conduct an initial review will be described in further detail below. In some instances, an initial review is performed substantially similar to that of a review performed upon exit or entrance. It should be understood that an initial review can be a review of a subset of the data used in a review, review different information than that examined in a review, be of similar scope to that of a review. The system can perform the review using a lookup table, an information checking algorithm, or the like to check whether biographical information, including travel information, meets one or more predefined criteria. For example, the system is configured to conduct an initial review of a name provided by an individual attempting to enter a country. In the preceding instance, the system may check a database of names to determine whether the name is in the database, is an alias of a name, or is a colorable variation of a name. The system can be programed to employ an algorithm that checks whether the name being reviewed is a misspelling, a nickname or variation of a name in the database (e.g., the name "Jon" for "John"). In these instances, the system is programed with one or more algorithms such as a text parser that parses, or breaks up "words" into components for analysis, a dictionary of names (including variations and/or common misspellings), a phonetic comparison algorithm, and the like.

The system 202 can be configured to access a variety of information sources in response to an initial review. Information from additional sources can be used as the basis of the review. For example, responsive to a determination that the individual has a criminal history, the system access a third party database, e.g., state criminal records, to determine whether to implement additional precautions or procedures, e.g., additional or more intrusive screening, e.g., heighten screening of physical objects associated with the individual. What procedures or combinations of procedures are to be use may be stored in a database that dynamically selects based on available information, e.g., in a name record, other databases, accessible from a third party. In the foregoing instance, the system in response to the review obtains additional information and bases its review at least partially on that information.

Returning once again to operation of the collection device 232 in connection with the system, the collection device 232 can store the information, in response to obtaining information from a token, e.g., an identification token such as a passport. The system can store the information locally, such as in local memory 238, communicate the information or a portion thereof to the central resource 234, store part locally and part on the central resource and combinations thereof. In embodiments, the information is temporarily stored in local memory before transfer to the central resource at a predetermined time or on an occurrence of an event, e.g., an individual enters customs, the person is "cleared", the person's plane departs, a period of low processing and/or communication demand, and so on.

The system's decisions on how, when, and what information is to be communicated, such as using communication unit 242 can be based on a variety of factors. For example, the system, including the collection device, communicates some information (e.g., biograph information) first while biometric information is communicated later as it typically is of a larger size than biographic data. For example, while hash of a facial image (facial image hash) is communicated in real time or near real time, an underlying image may be communicated at night or a period of low processing and/or communication demand. What information, when information is communicated, and how it is communicated can be determined based on other rationales. For example, information is communicated to permit distributive computing, allow for load balancing, and so on. In some instances, information is communicated to the central resource for storage and/or processing. In other instances, data is held in local memory associated with a facility, e.g., an airport, until requested by, for example, the central resource.

In additional embodiments, other systems preprocess the information or a portion thereof. For example, an airline check-in system pre-processes, such as by prepopulating information, information before communicating it to the central resource 234.

In embodiments, the collection device includes or is associated with a physical access control device for controlling physical access or passage by individuals. For instance a physical access control device meters access into or out of a sterile environment, such as customs inspection area. Example access devices include "man-traps," gates or "electronic gates," "vestibules," and the like. For instance, the collection device is an electronic gate including one or more of a camera to capture a facial image, a scanner (e.g., an image scanner) to capture fingerprints, a magnetic or radio frequency identification (RFID) scanner to read information encoded in a magnetic or RFID chip associated with a document, e.g., a passport. The access control device can be physically coupled with the collection device, such as in a single unit, or it can be communicatively coupled either directly via a wireless communication connection or via a connection with the central resource that is in communication with a device that functions as a collection device.

In embodiments, where a smart phone or other mobile device is configured to function as, or function at least partially as, a collection device, the smart phone can be associated with the access control device in a variety of ways. For example, a smart phone and access control device are wirelessly coupled by a local area network, such as by BLUETOOTH, an IEEE 802.11 compliant receiver/transmitter, a cellular compliant transceiver compliant with a commercial cellular standard.

In other embodiments, a smart phone or other mobile device is associated with the access control device via communication occurring through the central resource. In other embodiments, a mobile device is associated with an access control device because the smart phone outputs a unique identifier, such as an optically recognizable identifier used to trigger an event. Examples of the foregoing include, but are not limited to, machine readable identifiers, like a barcode, SIM cards, etc.

In another example, after inputting relevant information (e.g., biographic/biometric information) via a smart phone, it receives a bar code usable to open an electronic gate so as to exit/enter an area. An example of the foregoing is to allow a user to exit a mantrap by displaying a bar code to an optical scanner to support this functionality. In the previous example, a program or application on the smart phone is constructed to permit users to interact with the access control device. For example, responsive to successfully concluding screening by a smart phone the central resource instructs the access control device to open. As should be apparent, a smart phone or other mobile computing device can communicate with the central resource which in-turn communicates with the access control device. In still further embodiments, the smart phone (including a supporting application) communicates with the central resource and receives a unique identifier that is usable by the collection device to access information.

With continued reference to FIG. 2, the central resource is illustrative of functionality to support one or more collection devices, and so on in the system. The central resource can do this by storing, obtaining/validating information, coordinating information, matching records, and combinations thereof. In embodiments, the central resource includes one or more computing systems or servers constructed to provide central resource functionality. In implementations where multiple computing resources, e.g., computing are implemented, individual ones may operate in a redundant fashion, perform load balancing, and so forth to provide substantially seamless support. Redundant support and/or load balancing between multiple computing resources can be handled in a variety of ways. In some instances, different systems can perform different tasks or portions of tasks, while in other respective central resources accept/hand-off tasks as the individual computing systems become busy/become less busy. In additional embodiments, components or functions performed by the central resource may be performed or partially by a resource located in a local environment, such as at an airport, port, customs facility, port of entry, and so forth.

The collection device and central resource can communicate in a web-enabled manner. For example, data communication is performed using hypertext transfer protocol (HTTP) or hypertext transfer protocol secure or hypertext secure sockets (both are referenced as HTTPS). In an additional implementation, extensible hypertext markup language (XHTML) is used to communicate or present information. The collection device and central authority may implement other standards, such as extensible markup language (xml), in conjunction with or separate from public key encryption (PM) used to encrypt the data for communication or storage. In embodiments, the collection device and central resource communicate in a client-host arrangement.

With reference to FIG. 2, as illustrated the central resource 234 functions as a hub in a hub and spoke configuration with collection devices, other systems (e.g., common carrier reservation/check-in systems), computer systems operated by governments or law enforcement, quasi-government organizations (National Center for Missing and Exploited Children), and so forth. As should be apparent, the central resource 234 can function in a variety of ways depending on the corresponding system/device with which it is interacting or receiving communication. The central resource, for instance, is only configured to receive information from common carrier systems, while it handles different tasks for collection devices, "internal resources," and so on.

As illustrated, the processor 210 for the central resource 234 includes a matching module 218. The matching module 218 represents functionality to accept information, generate records, match entry/exit records for individuals, verify information, and so forth. The matching module can be comprised of computer executable instructions, e.g., a program or script, that are constructed to enable the processor to perform the described task.

The matching module 218 can be constructed to receive information from a variety of sources including, but not limited to collection devices, other systems, and so forth. For example, the central resource 234 is constructed to save biographic, biometric, and/or travel information in a record for an individual for which a record does not exist. The foregoing occurs when, for instance, the individual is entering the country for the first time. In other instances, a new record is generated for an individual instance (e.g., each time a person enters the country). Although biographic and biometric information may be associated with one another in a record, those of skill will appreciate that the matching module can be configured to separate the information or otherwise arrange it to promote rapid searching based on a particular criterion or criteria or a design preference. For example, a record, to which the matching module stores the information for an individual, includes a link that directs access to the biometric information stored in a corresponding biometric information record.

As should be appreciated, a collection device may include a matching module to function in a manner as that described in conjunction with the central resource. It should also be apparent that one or more of the central resource, a local computing resource (e.g., one or more servers co-located with collection devices), and the collection devices can include a matching module that performs the same or similar functions to the matching module 218. In some embodiments, the local computing resource and/or collection device can perform match or a portion thereof, such as preprocessing information to be used in matching.

In some instances, a subset of the biometric information is retained in the record, e.g., a part of the biographic information or a computational result that is indicative of the biometric information, e.g., a biometric signature, a hash of the biometric information. In the foregoing example, the biometric module and/or the matching module calculate the biometric signature based on collected biometric information, e.g., facial dimensions. A biometric signature can be used to promote rapid biometric matching such as for routine identification. In embodiments involving multiple records, they can be linked via a unique identifier, such as a passport number, a session identifier, an assigned number, or the like.

For example, the database 214 and records stored therein are structured to facilitate searching based on name, identifiable biographic information (e.g., eye color, tattoo description). The foregoing can be done by segregating some information in a record (e.g., in a name record or entry record) from other information (e.g., separating biometric information, such as the majority of an individual's biometric information, from biographic information), duplicating some information in a table (e.g., a lookup table), indexing information, and so on to increase efficiency relative to a database without such a feature. Biometric information or portions thereof can be handled in similar manners. In embodiments, information associated with a particular trait or traits, e.g., eye spacing, is used to aid in rapid general identification or eliminating possible matches, while other identification techniques (other traits, combinations of traits, behaviors, etc.) are used to promote accurate identification by confirming an individual's identity.

In embodiments, the approaches, techniques, algorithms, implemented by the matching module 218 are tailored based on database structure and/or operating parameters. For example, the algorithm is configured to match an individual leaving with his/her entry record by matching information in a particular order. For instance, the matching module 218 implements an algorithm that matches entry records based on the country that issued the passport in order to reduce the records to be searched before searching for a particular passport number. In another instance, the algorithm uses a unique identifier (e.g., a machine readable bar code on a travel document) that points to a record to which a match is to be made. In the previous example, the matching module 218 attempts to make a match, e.g., match identities, based on the unique identifier before reviewing other records and/or lists or a database of individuals for which alternate procedures are to be employed.

The matching module 218 can be configured to operate in a variety of modes that are accessed responsive to user input, e.g., a system manager configures the system to implement a higher accuracy level in comparison to standard operation or dynamically based on a variety of information factors. The central resource 234, for example, supports a GUI that is configured to accept user input to increase the matching module's certainty level, such as during a time of heightened security in comparison to normal operation. In the preceding instance to increase accuracy, the matching module 218 matches additional information to increase certainty. In other embodiments, different information or additional information can be used to increase certainty. For example, instead of performing a "standard" biometric match, that yields ninety-two percent (92%) certainty, the matching module performs a more in-depth review that increases accuracy to ninety-eight percent (98%) by matching more factors, matching to a greater degree of accuracy, combinations thereof and so forth.

In other embodiments, the matching module 218 dynamically alters how and/or what algorithm is used to confirm a match. For example, if it appears based on biographic information an individual is to be subject to additional procedures, e.g., additional safety screening, the algorithm implements additional checks to heighten certainty that the individual or his/her information does correspond to an individual warranting this type of treatment. The foregoing is done in comparison to a situation in which the individual is not associated with additional procedures. In additional embodiments, the matching module is configured to alter how, what, and/or to what extent biometric information is used to identify an individual. For example, an algorithm used by the central resource applies a higher facial recognition standard to an individual associated with poor fingerprint image, such as a brick layer.

Example heightened checks comprise additional information matching, the use of different or more rigorously applied biometric identification algorithms (in comparison to that commonly implemented by the central resource). For example, while the matching module 218 implements a target matching algorithm to identify an individual who is not to enter the country, an identification algorithm is used to verify the individual is indeed the individual who is barred from the country. In other examples, the matching module dynamically lowers accuracy to a predetermined acceptable level in order to increase the number of individuals that can be screened.

In some instances, the matching module 218 coordinates information for a current instance with historical information. In some instances current information is married with historical information. In other instances, the matching module 218 uses historical information as a check or validation on current information. The matching module 218 can perform this check by comparing a particular piece of information (e.g., a unique identifier such as a passport number) or based on a combination of information. An example of the latter situation is combining a first or given name, a last or surname, with a date of birth, and/or other biographic information to determine what tasks to perform, e.g., obtain additional information, impose predefined procedures, deny access, and so on. The matching module 218 in addition to or in place of the foregoing can also check the data to determine it is valid, e.g., a birthdate is composed of a month, day, year in that order.

Other information can be stored in conjunction with at least some of the information (biographic, biometric, travel). For instance, the matching module 218 includes a unique identifier (e.g., a record identifier, a session identifier) with the information. The matching module can include other information in the record as well. For example, the matching module includes one or more of a time stamp, a software version, algorithm configuration, and the like with the information comprising the record. This other information can be included directly or used as metadata to biographic, biometric, or travel information.

Memory 216 can be used to store information in a variety of ways or formats. For example, information for an individual whether obtained from a collection device, received in a manifest, or obtained from another system, can be stored in a record that is generated when an individual enters or attempts to enter a country. In other examples, information is stored in a name record that contains information for (potentially) multiple instances. A name record for example may contain information for multiple visits, e.g., multiple entry/exits for a particular individual in addition to containing biographic information for the individual. Memory 218 can house other databases, e.g., a manifest database configured to contain manifests from common carriers. Memory 218 can house or contain other databases, tables (lookup tables) and so forth. For example, information for people meeting pre-specified criterion can be housed in a separate database or lookup table.

Other example databases include a procedure database that details procedures, prompts, questions, additional information, and so on to be used. For example, the central resource includes an information database that details common information associated with a geographical area (e.g., a departure city, country, state). The central resource may use this database to formulate questions designed to test whether an individual is aware of information that is commonly known for an area.

In implementations, the central resource maintains information associated with certain characteristics in a database for comparison against information for individuals. An example of the foregoing is the matching module, as part of receiving and/or storing information, uses a lookup table to determine whether information for an individual matches or at least partially matches that contained in the table. For example, the matching module implements a script or other logic to determine whether the name of an individual is that of someone who is not permitted to use a particular form of transportation. In this example, not only may the lookup table include information persons meeting a preselected criterion, but it can include colorable variations of the information. Example variations include alternative spellings, misspellings, aliases, date ranges such as for birthdates, variations in physical descriptors (e.g., brown for hazel eye color), combinations thereof, and so forth. While the forgoing checking has been described with respect to record creation a substantially similar process may be used when matching information for a person leaving with that of an entry record. Moreover, the matching module 218 can implement a matching algorithm, e.g., a graphical based algorithm, that accounts for variation in individual pieces of information.

Moreover, while the preceding processes are described in conjunction with storing information, in some instances information is stored in a record and then compared to determine whether a match exists. For example, rather than delaying overall productivity, a server functioning as the central resources temporarily stores information into the database and then review it rather than checking and storing the information in series.

In embodiments, the central resource 234, e.g., the matching module 218, validates information to ensure it is properly formatted (e.g., the information is valid), conducts an initial review of the information, or a combination thereof. For example, the matching module 218 checks the information to determine whether it duplicates previously submitted information. The foregoing can be done by querying the database based on one or more portions of the information. For example, it may check a passport number against those in the system to identify someone attempting to use an altered passport, i.e., the passport has a valid passport number but the contained information is not accurate to the information upon which the passport was issued. Although validation is described in conjunction with the matching module 218 in other instances the validation and/or initial review functionality is embodied as a validation module. Such a validation module is representative of functionality to validate information and supported by a program of instructions, e.g., implementation of a set of validation rules by the matching module. For instance the central resource 234 includes a validation script that executes to perform validation logic. Validation or initial review can be performed in a distributed manner, e.g., a collection device performs a portion of the task and the central resource performs other portions or confirms the validation or review.

The central resource 234 and matching module 218 can be configured to perform additional tasks. For example, periodically or upon request the central resource is configured to check whether individuals corresponding to records in a database meet a predetermined criterion, e.g., overstayed his/her visa. In instances like this, the matching module 218 or another component of the central resource check records containing information meeting the criterion, e.g., "overstay." In response, the central resource 234 creates or updates a database with information from records that meet the criteria and/or creates/updates a table or other data structure with links to records that meet the criterion. The central resource can add information to the record to indicate the record meets the criteria. For example, in addition to populating an overstay database with information for people who overstayed his/her visa the matching module may flag the records by including information in the record that shows the person has overstayed.

With continued reference to FIG. 2, having described how the system 202 and its components function, further description is now provided of an exit process. In an exit process, the matching module 218 may make a determination that an individual matches a particular record, e.g., a record with information for the person's entry. Similar to an entry process, the matching module checks information for an individual against a "list," registry, table, or database as part of the matching process to determine if the individual is allowed to proceed, e.g., exit, and/or under what procedures or conditions are to be applied. While information for a person exiting can be compared to information used during entry, in other instances the information is compared to different information. An example of the foregoing is comparing information (e.g., travel, biographic, biometric, a unique identifier) for an individual with that of information of individuals who meet a predetermined criterion, e.g., overstayed a visa or permit.

Solely for the purposes of example, clarity, and discussion a computer system, such as a custom official's work station 262 is illustrated to further describe the system 202, method, techniques, and approaches that can be implemented in accordance with the present disclosure. It should be apparent that a collection device or a combination of collection devices can be configured to provide the functionality. Also like a collection device, the workstation can be associated with an access control device, e.g., an electronic vestibule.

In the current example, an individual, who wishes to depart the country, is screened as part of an out processing procedure. Among the tasks in such a procedure, the system 202 checks that the individual does not meet some predetermined criterion (e.g., is wanted, not permitted to fly, has overstayed, is not permitted to leave the country) and matches the individual and his/her information to an existing record, e.g., a record populated with entry information, in order to complete the record and/or to generate an exit record, e.g., a name record with exit information, that is associated with the entry record. Entry and exit records can be related by a unique identifier, e.g., a record number, a session number, a bar code, and combinations thereof. As illustrated, the individual has one or more tokens (e.g., travel ticket, passport 264) that collectively or individually are associated with the record 212.

The individual may provide information directly or indirectly, e.g., to the workstation or to the official for entry. An example of the former situation is the individual providing information by typing it into the system 202 or capturing an iris scan or picture of his/her face. Examples of the latter situation include a customs official inputting information on the individual's behalf, the individual scanning a bar code, or the like. For example upon reaching a kiosk, an individual scans his ticket and/or passport to provide biographic, biometric, and/or travel information when exiting the country.

Using the unique identifier and/or information, the system 202 matches the individual/the information for the individual to a record, e.g., a name record with information collected when the person entered the country. The central resource 234 supporting this effort may, for instance, attempt to identify the record based on the unique identifier before attempting and/or confirming the identified record is the correct one based on matching information associated with the exit event and the individual with corresponding information from the entry record. For example, the central resource 234 checks biographic, biometric, travel information in an effort to determine to a predetermined level of certainty that the individual is indeed that reflected in the record.

In some embodiments, confirmation of an individual's identity is performed by displaying an image, such as a picture of a person's face captured upon entry, and permitting a customs official to perform a comparison. In other examples, biometric information, a portion of biometric information captured at entry and exit are compared to determine a match exists. As should be apparent, biometric information can comprise a result of biometric information or identification. For example, the central resource uses a biometric signature that is indicative of biometric information to make the determination, e.g., confirm the person exiting is indeed that in the record.

It should also be appreciated that a biometric identification can be performed using biometric information contained in a token. For example, as part of exit process, the central resource compares biometric information captured contemporaneously from an individual with that of an entry record and biometric information from an identity token, e.g., driver's license, passport, etc. Biometric information from a passport can be obtained by scanning and analyzing a passport photo, or the information is obtained from a resource maintained by a trusted third party, e.g., Interpol, or the issuing government.

As should be apparent to those of skill in the art, the exact procedure implemented by the central resource 234 can vary based on circumstances, a level of certainty specified or dynamically determined, whether the matching is done for positive identification or targeting and so forth. For example, under routine matching biometric identification may involve matching readily identified characteristics, such as eye color, hair color, height, etc. Under more rigorous examination, other features, measurements of features and so on can be examined.

In examples, the central resource 234, e.g., the matching module 218, issues a unique identifier upon completion of matching information for a person attempting to exit with a record containing entry information. Example unique identifier include, but are not limited to, an electronic receipt with a bar code or other machine readable information, a record number to the individual, an electronic device associated with the individual (e.g., a smart phone), an account for the individual (e.g., an email account), combinations thereof, and so on. For example, the person's smart phone receives an email with a bar code that when scanned by an optical scanner on an access control device opens the device to permit the individual to pass.

In some embodiments the record number, bar code, etc. can be used by the individual to streamline a subsequent entry event. For example, information from a previous trip is used as the basis of populating information for a subsequent trip. The electronic receipt can be used to prepopulate or furnish biometric and or biometric information for a subsequent entry event. In this instance, the information is historical information for the subsequent entry event. In this scenario, the use of historical information (used without incident) may cause the system to use different procedures and/or outcomes.

While a variety of devices, components, examples, and scenarios are described, those of skill in the art will appreciate that multiple devices and components can be used and the various tasks handled among the components in a distributive manner, e.g., dividing up tasks, allocating user devices, and the like among the physical computing devices comprising the intermediate. Although one collection device and central resource are illustrated for simplicity, the system can include multiple devices and components with similar functionality or functionality that differs to permits that device/component to perform a particular task or role as described herein. Similarly but one component is illustrated for simplicity. It is to be appreciated for example, multiple components of similar type can be included. For example, a collection device includes an image capture device for fingerprints and another for iris scanning.

It should be noted that while various structures and functions are described with respect to certain members within the environment, the functions and/or structures may be implemented by other members in the environment, e.g., the central resource includes a validation module.

For example, a collection device includes a matching module to identify an individual. For example, instead of the central resource matching an individual, matching is performed by the collection device and/or a computing system operated in a local environment, e.g., a server at the departure airport. In scenario such as this, the central resource can preposition information in the local environment for use in matching. In some examples, the central resource prepositions biographic and biometric information associated with a traveler who is scheduled to depart the local environment.

Prepositioning can be done at various times, such as on a routine basis (e.g., 24 (twenty-four) hours ahead), a periods of low processing and/or low communication (e.g., overnight). Prepositioning of information may occur at discreet times. For example, biographic information and a hash of a facial image are sent at one time while an image of the individual is sent at another time. The foregoing may be done based on a variety of factors, such as data size, based on a predictive factor (inclement weather is forecast, and so on).

Processing a match at a local level can occur on a local computing resource or on the collection device itself. For example, as will be described in additional detail below, the prepositioned information may be in a generic form so it is agnostic of one or more of the device, software, algorithm used to capture or process the data, such as a biometric signature, e.g., positions of key facial features. In some examples, the data is agnostic of proprietary algorithms and/or data formats. In other instances, the matching module in the collection device performs biometric matching in a proprietary format using generic data. If for example, the collection device determines a facial hash is corrupt, it may retrieve the underlying facial image from a local server or the central resource and apply its algorithm to the historic image in order to attempt to make a match with an image captured contemporaneously from an individual being screened.

The network 264 illustrated in FIG. 2, and in other locations throughout this disclosure, can comprise any suitable type of network such as the Internet or a wide variety of other types of networks and combinations thereof. For example, the network 264 may include a wide area network (WAN), a local area network (LAN), a wireless network, an intranet, the Internet, a combination thereof, and so on. Further, although a single network is shown, the network 106 may be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Having considered an example operating environment, consider now further discussion of example devices, systems, operations, and data flows that provide a framework in accordance with one or more embodiments. The example devices, techniques, approaches, methods, and systems may be used in conjunction with the environment, systems, devices, techniques, and so on described above.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Example Methods

The following discussion describes procedures that may be implemented utilizing the previously described systems, techniques, approaches, and devices. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 200 of FIG. 2 and the systems (including the other system of FIG. 1), devices, modules, applications, algorithms, approaches, and techniques described above. While some block/decisions are captioned as "optional", there is to be no negative inference with respect blocks/decisions that are not denominated as "optional", i.e., the blocks/decisions are not "mandatory". In accordance with some embodiments, information is stored in memory (at least temporarily) during performance of the methods for a variety of reasons. Example rationales include, but are not limited to, data processing convenience, communication convenience, permit batch validation/review, records maintenance, and so on, and combinations thereof.

Figure 3:
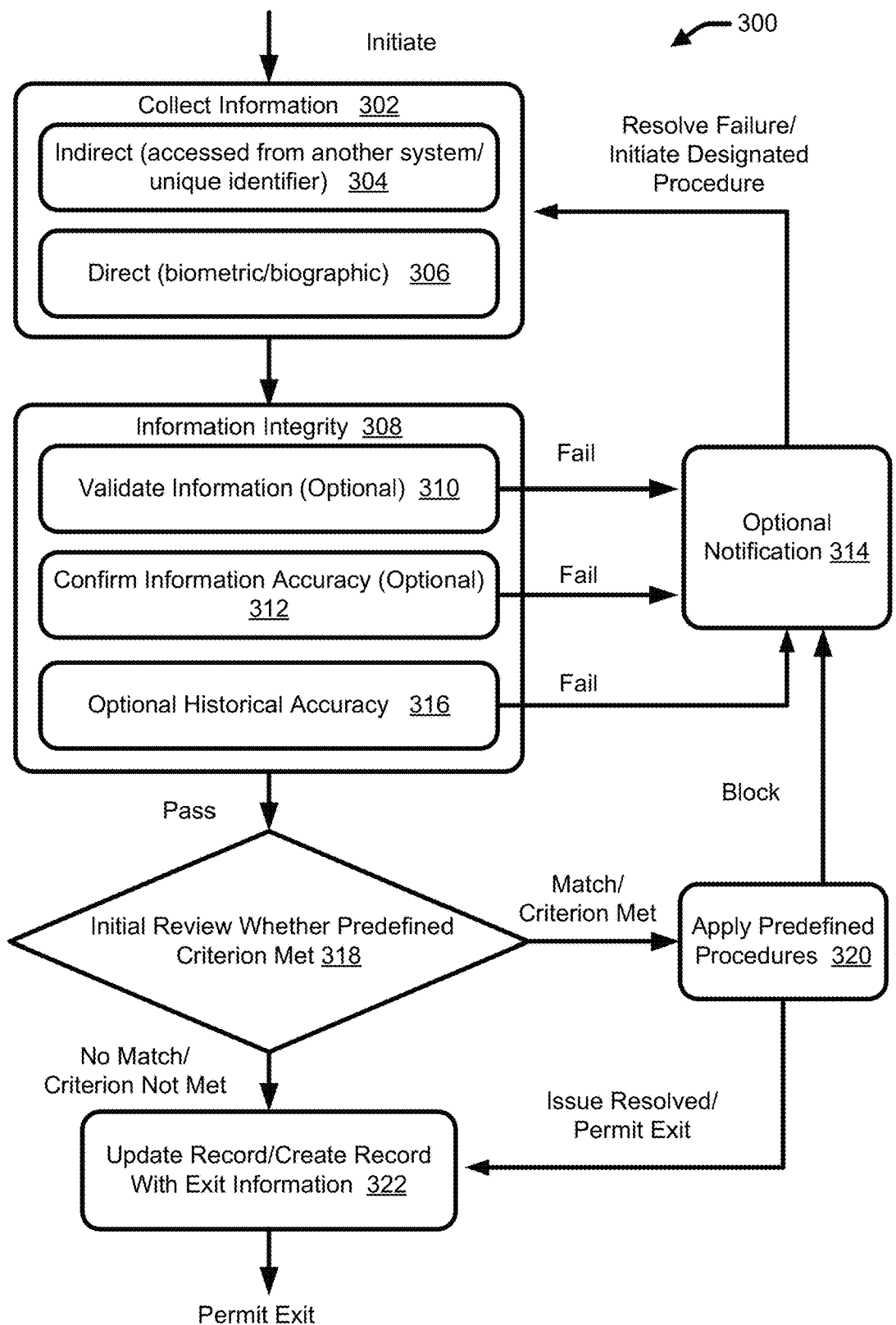
FIG. 3 is a flow diagram that describes steps in a method that can be used for screening individuals in accordance with one or more embodiments.

FIG. 3 is a flow diagram 300 that illustrates steps in a process for obtaining information, checking information integrity, conducting an initial review, storing information, and matching individuals and his/her information to a record. For example, the method 300 is used to determine whether an individual and his/her information meet a predetermined criterion, such as being on a no entry list. The steps can be implemented in connection with any suitable hardware, software, programs, scripts, firmware or combination thereof. In at least some embodiments, the method can be implemented in software by such as described above.

The method 300 can initiate in a variety of ways. Example initiation events include, but are not limited to an individual scanning a passport or boarding ticket or a person purchasing a travel ticket using a third party system in anticipation of travel. Initiation can involve pre-steps in which information is input or otherwise obtained that indicate an individual is passing through customs. An example initiation event is an individual obtaining a ticket that, if used, would cause him/her to pass through customs. In other instance, initiation occurs is in response to the person interacting with a system, such as the system described with reference to FIG. 2.

Step 302 collects information. Information can be obtained in a variety of ways. Information can be obtained directly 304 from the individual or indirectly 306 by accessing information from a resource. Information collection in embodiments is performed responsive to an initiating event such as a person scanning a barcode on his/her passport as part of checking for international travel or preparing to go through customs. In the latter instance, the person may interact with a collection device such as a kiosk, a smart phone with a suitable application on his or her smart phone. Although this can be done at a departure facility, it can be done prior to arrival at departure location by a person providing the information online to, for example, via an Internet enabled computer system.

Direct information collection 304 can include an individual typing information, scanning his/her iris, face (taking a picture), and so on. As part of traveling internationally for instance, a person types in information like biographic information, travel information to access the system. Biometric information can be collected by performing one or more scans. For example, a person uses a fingerprint "slap" scanner included in a kiosk to provide his/her fingerprints. Similarly, an image capture device (e.g., a camera) can be used to collect biometric information.

In some instances, inputting information such as name, travel destination causes the system to access additional information. In some examples, the information is stored in memory on the system, such as in a manifest for a flight. Available information can be pre-populated so the person can avoid entering information that is already in or available to the system.

In other examples, entry of information causes a central resource to communicate with other systems, e.g., a ships travel database, to obtain passenger information (indirect information collection) which may include biographic and/or biometric information for information. In some instances, obtaining information indirectly includes converting it from one format to another. An example of this scenario includes converting an image from a postscript file format portable document format (PDF, Adobe Systems, Inc., San Jose, CA) to a JPEG format so the image is understandable by the system or the system implements a common format. Information can be indirectly collected by decoding information that is encoded in machine readable media (e.g., on a magnetic strip) or information encoded in an optically readable identifier.

In some embodiments, information collection is facilitated by an application running on a computer enabled device, e.g., a kiosk, smartphone, and so on. The application in embodiments supports one or more GUIs for collecting information via text boxes, check boxes, radio buttons, calendar selectors, and so forth. The application can collect information from one or more biometric information collection devices. Example biometric information collection devices include, but are not limited to, cameras (visible, infrared), fingerprint scanners, microphones, and iris scanners. The application can be supported by corresponding APIs to permit biometric information collection using hardware and/or software on the device capable of providing this functionality. Biometric information collect can include analysis of collected information. Analysis can include, but is not limited to, a biometric signature that represents or is indicative of at least some of the biometric information, but is of a sufficiently less size to permit effective communication/data processing.

Step 308 illustrates optional information integrity checks. Example integrity checks include validating information, confirming information is accurate, and confirming information for a current event is accurate to historical information if historical information is available for comparison. These checks can be triggered responsive to an event. For example, a validity check is performed responsive to a person submitting his/her information. Accuracy confirmations may include checking entered information with information to determine the information is accurate. An example of the foregoing, is the central resource checking an entered given and surname against those in a flight manifest to ensure it matches. A historical confirmation can compare currently entered information with information that is of a sufficient difference in time to indicate it is likely accurate. These integrity checks can be performed as a matter of routine or upon an event such as a determination that biographic information does not match to a predetermined level or the biographic information matches or likely matches biographic information meeting a predetermined criterion (not permitted to fly). Different components can perform the integrity checks. For example, the central resource handles accuracy and historical accuracy checks, while validation is handled by or at least partially handled by a collection device. In performing such accuracy checks, an indication of the outcome can be maintained with the information itself (e.g., a validation id) and/or in a separate data structure for this purpose. In some instances, the central resource maintains a table or separate database of such checks.

Step 310 is an optional validation check to determine information is valid. Step 312 is an optional accuracy check. For example, the match module 218 is configured to validate and/or check the accuracy of information to determine whether data entered in a text box is valid step 310 (e.g., numbers are entered into a zip code text box) and is accurate step 312 (e.g., five numeric digits correspond to an actual zip code). As illustrated, several outcomes can occur. Example validation accuracy outcomes include, valid and/or passed review (an affirmative outcome); not valid and/or did not pass review (a negative outcome, generally illustrated as failed outcome and optional notification 314. An example of the latter situation, is a situation in which, for example, a zip code text box is valid (includes numbers), but the numbers do not correspond to a recognized zip code. In scenarios that result in a not valid, no pass, or ambiguous outcomes, a record can be generated that notes the determination (non-validation or review failure), stores relevant data, and so forth. An alert, an error message, or a message that facilitates corrective action can be displayed by the output module 120 on the mobile device. An example of validation and accuracy checking for biometric information include, but is not limiting to, checking a collected fingerprint to determine it (to an appropriate predetermined level) corresponds to a valid type of fingerprint, e.g., loop, whorl, or arch, and the fingerprint is sufficiently identifiable so as to permit accurate matching.

Step 316 is representative of an optional historical accuracy check that can be part of an overall information integrity step. In embodiments in accordance with the present disclosure, the matching module 218 checks information from a current instance (e.g., biographic information enter via a smartphone) with that provided during a previous trip several years prior. Once again, if the information fails this historical accuracy check an optional notification can be provided and appropriate procedures implemented e.g., block 314. The specific procedures, like that of the validation and accuracy checks can be detailed in an appropriate data structure. Which procedures are to be implemented can be based on a variety of informational factors as determined by the matching module.

Step 318 is representative of determining whether the information meets one or more predetermined criterion. In doing the foregoing, a system performing this function can implement a series of rules that may be maintained in a rules database or other similar structure.

For example, the determination comprises checking the information to determine if based on one or more criterion the individual meets a predefined criterion that, for example, would bar him/her from entering the country, require implementation of additional procedures, bar him/her from a particular mode of travel (e.g., air travel), and so forth. In some instances, the predefined procedure (as illustrated by box/step 320) may entail additional screening, implementation of special procedures (e.g., additional questioning, heightened screening, modification of travel arrangement, and combinations thereof. While the predefined criterion may represent a specific criterion or criteria, in other instances a system employing the method dynamically determines whether to and what procedures to apply. For example, the matching module 218 implements a dynamic scoring algorithm to determine whether or not to impose additional procedures as part of allowing an individual to travel to the destination country or what procedures must be followed once he/she has arrived. A matching module performing this function can implement rules that specify what to do, e.g., "direct traveler/party to secondary screening", while in other examples, the rule may provide instructions to, for example, a customs official to ask one or more specific questions. The instructions embodied by the rule can be communicated or accessed by the customs official from the central resource.

Step 322 is representative of a step or steps of creating an exit record with information for the exit event and/or updating a previously existing record. In the former example, an exit record can be linked to the exiting record via a unique identifier or a link that coordinates the exit record with the previously existing record, e.g., a record that contains entry information. An example of the latter situation is a system performing the method storing exit information with information collected upon entry (e.g., "completing the entry record") or in a record that includes information for multiple trips made by the individual that are associated with the individual's passport number, name, other unique identifier and so on. The previous example presumes for the sake of explanation only that the individual has previously made trips that are encompassed by the record. The generated record can be stored in an appropriate database. Having described example systems and methods, additional features that can be employed to facilitate effective screening and record keeping for a massive scale system are now described.

Information Positioning

Figure 4:
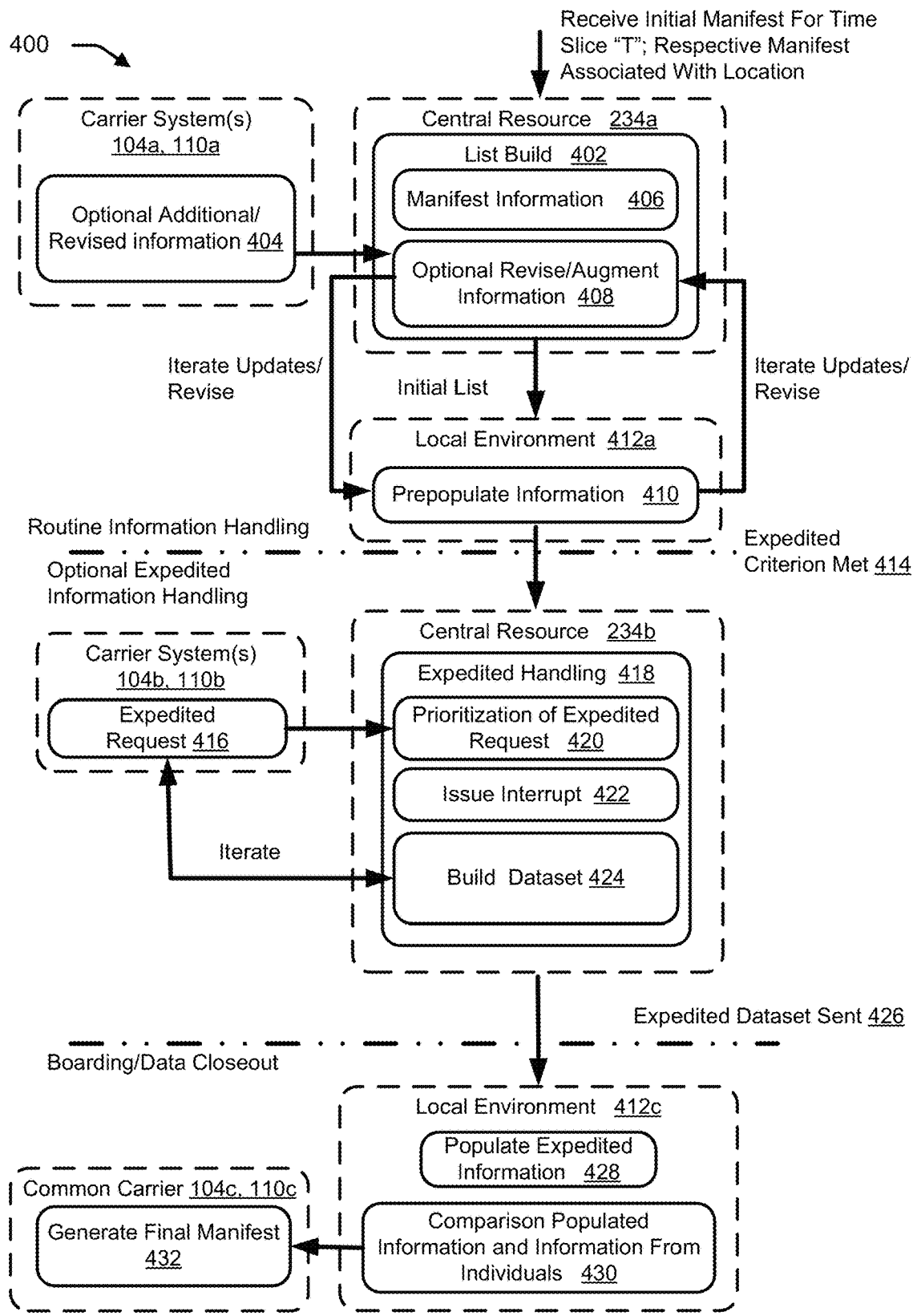
FIG. 4 is a flow diagram that describes steps for managing a massive number of transactions and information in accordance with one or more embodiments.

Referring now to FIG. 4, methods, techniques, and approaches for handling transactions, in particular large numbers of transactions, are described. As illustrated the methods, techniques, and approaches position information in order to avoid central resource processing and communication bottlenecks associated with large-scale systems. These techniques, approaches, and methods can be used to minimize episodic processing and communication demands on a distributed information system, such as a system used in screening individuals entering/exiting a country. While example hardware is illustrated in conjunction with the method 400, it is not to be considered as restrictive of the method. Those of skill in the art will appreciate that a variety of hub and spoke information systems can benefit from the principles of the present disclosure. Alphabetical suffix designations are added to example physical devices to distinguish its actions and behaviors at different points in time. Although a single manifest for a particular location is discussed, the principles are applicable to multiple locations and transaction.

In embodiments, information positioning includes routine handling and expedited information handling. Routine handling can include prepositioning information among resources to promote efficient overall system processing or communication in order to avoid bottlenecks. For example, the central resource sends an initial list to a server supporting an airport the night before a flight is scheduled to depart. This may free the central resource to handle requests made on an expedited basis in a more efficient manner, such as during the daytime when it is more likely for changes to occur, e.g., more individuals are making changes to his/her travel plans, or closer to the vehicle's departure time.

Routine handling may be used to position a majority of the overall data that will be used by a system implementing the method over a period of time. A majority in the previous example, may be substantially all the information (by data size or type, such as biometric data) used by the system in comparison to information that is handled on an expedited basis. Example majority amounts include, but are not limited to, 70% (seventy percent), greater than 70% (seventy percent), 80% (eighty percent), greater than 80% (eighty percent), 90% (ninety percent), greater than 90% (ninety percent), 95% (ninety-five percent), greater than 95% (ninety-five percent), 98% (ninety-eight percent), or greater than 98% (ninety-eight percent). Handling a majority of the information on a routine basis can increase overall efficiency in comparison to handling interruptions that cause a resource to: interrupt another process, search an index for a database for the location of the information, access the information on the physical data storage device, process the information, and communicate the information. Naturally, it is to be appreciated that a local resource, such as a server or data collection device, can face similar computational and communication challenges handling expedited information in comparison to handling information on a routine basis.

The method 400 may commence by receipt of an initial manifest. The manifest can be associated with a particular time slice (e.g., period of time or "T") and a location, e.g., Reagan National Airport. For example, the central resource receives a manifest containing at least some biographic information for passengers on a particular flight, e.g., flight 5400 from Stockholm to Denver.

Block 402 is representative of building a list based at least partially on the initial manifest. For example, the list is based on biographic information, such as name, passport number, contained in an initial manifest for an international flight. At various times before the list is prepositioned, additional or subsequent manifest may be provided. For example, the central resource receives an initial manifest 48 (forty-eight) hours prior to expected departure and then receives an updated manifest 24 (twenty-four) hours prior to the anticipated departure time. In other instances, an initial manifest is sent 24 (twenty-four) hour prior to expected departure.

Building a list may include obtaining additional or revised biographic and/or biometric information for individuals represented in the manifest. Optional additional/revised data is illustrated as block 404. For example, the central resource 234 accesses databases 214 to obtain additional information, information beyond that in the manifest. In embodiments, additional information is obtained only for those individuals meeting a particular criterion or criteria. In some embodiments, the method includes checking information from the manifest with information maintained by a system performing the method.

For example, the central resource includes an algorithm for checking biographic information against that in a database maintained by the system. An example of the foregoing is an algorithm that is configured to identify inconsistent biographical information and identify and/or classify any differences between information supplied in the initial manifest in comparison to that in memory or that obtained from a third party resource, e.g., a law enforcement information system.

For example, the central resource implements the algorithm to identify that in all likelihood Jan made a typo in his passport number, and his middle initial does not match that maintained in the records. Individually, these discrepancies may not rise to a level that triggers action, but together the differences would be sufficient to present a recommendation that Jan be questioned or a higher level of review be applied when reviewing corresponding biometric information. The algorithm may be programed to weigh the inconsistency or omitted information and provide a corresponding output, e.g., ignore the inconsistency as it is below a threshold, recommend additional questioning, heightened biometric screening, refer for secondary screening, communicate with a third party (e.g., law enforcement). The algorithm in the preceding instance can be programed to do so in an adaptive manner. In this way, common or non-indicative errors can be ignored (as they do not meet or exceed a threshold) while discrepancies that are indicative of unwanted behaviors are identified (meets or exceeds a threshold) and applicable outputs, such as screening recommendations are made.

A system including the algorithm performing the method, can be programmed to function dynamically. Examples of dynamic functionality include implementing an algorithm that is capable of adjusting thresholds, identifying macro trends, changing outputs. These techniques can be performed on various levels, e.g., globally, at a particular location, for a mode of transportation (e.g., flight, train travel, ocean voyage), for a particular instance, e.g., a single flight, flights originating from a particular airport country or region.

List building 402 can include determining Jan Jorgenson is in-scope (an example of a predefined criterion) and then obtaining additional information beyond that in the manifest. For illustrative purposes, information from an initial or most recent manifest is illustrated as block 406. It should be evident that building a list can include building it from information in, for example, databases 214 based on information identified in the manifest. This is to say that the list is built from database information based on information from the manifest that indicates, at least partially, what information is to be include in the list. The list can also include information that is generated as part of building a list. Examples include, but are not limited to an outcome of a decision, a flag or warning, or a recommendation.

The method, upon determining Jan's passport number is included in the manifest, accesses biographic and/or biometric information that is associated with Jan, such as in a name record identified by passport number in memory 216 when Jan enrolled. In some instances, information retrieval is based on a predetermined criterion, such as Jan being an in scope individual. Other criterion may be used as well. The pre-specified information to be included in the list may be accessed and included in the list. Example information to be included in the list includes, but is not limited to, name, gender, citizenship, and address. Other examples include, an image (e.g., a historic image such as captured during enrollment or a previous screening), a hash of facial image, a hash of one or more fingerprints, a signature image, a hash of a signature image, and combinations thereof.

In some instances, a common carrier or a local environment, such as an airport authority or port authority provides information. As illustrated by block 404, a variety of information source can provide additional and/or revised information for inclusion in the list, whether initial or otherwise. Manifests and updates to manifest information may be provided at various predetermined times prior to departure to permit efficient processing and/or communication of at least some of the information in the manifest. Information received by the central resource can include additional or revised information, including deleted or canceled information to a manifest, such as a most recent in time manifest. A common carrier may provide information such as this on an ad hoc or a scheduled basis, to account for changes that occur after a manifest is sent, whether an initial, interim, or final manifest. Ad hoc communications can be sent based on dynamic timing. An example of the foregoing is a common carrier responsive to an indication that the system 202 has available processing and/or communication resources.

The manifest information and as applicable additional or revised data is combined to form an initial list (block 408). An initial list is representative of information that is pre-populated to a local environment. While an initial list may represent all, substantially all, or a significant portion (e.g., by data size or data type such as biographic information) of the biographic/biometric information that is to be provided to a local environment, in other instances it may be a portion of the information. The initial list may include for example some biographic information with all, substantially all, or a significant portion (e.g., by data size) of the biometric information to be provided for matching individuals.

In embodiments, the initial list is prepositioned (block 410) for use in a local environment prior to anticipated usage. For example, the central resource 234 communicates at least some biographic information, biometric information, or combinations thereof to a local environment 412. In the previous example, the local environment can be a computing resource, such as a server that supports for example a destination airport. The initial list may include the available biometric information, biographic information, or a combination thereof of information that is available for individuals arriving for a given time period, a particular flight, or the like. For example, the list includes the biometric and relevant biographic information for passengers on a cruise ship. Example biometric information may include one or more of a historic image (e.g., passport photo), biometric facial measurements, an image of a traveler's fingerprint, information from a retina scan, and so on that can be used to bio-identify an individual.

In some embodiments, a list may also include instructions for the local resource (e.g., server, collection device) to follow. For example, the central resource, via the list, can instruct a collection device to implement a higher bio-matching threshold, collect additional biometric information (e.g., capture all finger prints, a palm print), ask for biographic information, require additional screening, check for contraband, and so forth.

In embodiments in accordance with the method 400, an initial list may be communicated at various points in time prior to departure. For example, the central resource may send the initial list 24 (twenty-four) hours prior, approximately 24 (twenty-four) hours prior, or based on one or more of processing resource or communication link availability at or near a predetermined time. In an additional example, an initial list is processed 24 (twenty-four) hours prior to departure, but the information is not communicated until 20 (twenty) hours prior to departure to avoid overwhelming communication links, local resources, based on another priority (e.g., number of individuals on a flight), or combinations thereof.

Prepositioning information, such as by communicating and receiving an initial list to a local environment can result in the information being populated to memory associated with a local environment 412. For instance, information included in the initial list is used to populate a local database that supports a particular airport or collection of airports. This permits the system to position information based on allocable system resources. The foregoing may speed local processing/identification as communication and central processing delays are avoided.

Upon occurrence of a criterion 414 being met, the method can switch from routine information handling to handling information on an expedited basis. For example, a system performing the method is programmed to handle updates on an expedited basis 20 (twenty) hours prior to anticipated departure. In other examples, expedited handling is associated with the availability of communication/processing resource or the predicted availability of resources based on historic usage.

Expedited handling may be performed on an ad hoc basis as updates and revised information is supplied to a system performing the method 400. In an example, an expedited request is received from a common carrier to add an individual who is not identified in the initial list/information populated to the local environment subsequent to the criterion being met. In this instance, a carrier system requests (block 416) that the central resource process the request (block 418) so the individual can be screened and travel to the destination.

Responsive to receipt of the expedited request (block 416), the method 400 can prioritize (block 420) the request among the tasks to be performed. Example tasks are routine information handling, expedited request handling, and so forth. Prioritization can be based on a variety of factors including, but not limited to, departure time, available resources, impact to the individual, impact to common carrier, screening considerations, security factors, time, and combinations thereof.

The method 400 optionally can issue an interrupt (block 422), e.g., a processing interrupt, to dedicate resources to, for example, accessing a name record based on a unique identifier such as a passport number or other biographic information. Issuing the interrupt (block 422) can include setting a flag to prevent information from a record from being used until the flag is released. The foregoing can be used to prevent reuse of the information for more than one transaction, e.g., reuse of an individual's identity for improper or illegal purposes and promote data integrity.

A dataset including biographic and/or biometric information that is to be used in matching an individual is built (block 424). Building a data set may occur similar to assembling information associated with an individual during routine information handling. This can include encrypting and/or packetizing the data for communication.

In some embodiments, the request and/or information to be provided is subject to various processes (e.g., validation, integrity checks) as part of the dataset build process. In some instances, the dataset build process (block 424) implements additional procedures based on a variety of factors. Example factors include, but are not limited to, type of travel, time to anticipated departure, departure location, destination location, and factors associated with other individuals traveling on the vehicle.

The expedited dataset is communicated 426. For example, the encrypted and packetized dataset is communicated to the local environment 412c, e.g., a server supporting a departure airport. The communication can occur at a predetermined time, based on the prioritization established when the expedited request was received, as resources are available, on a first-in-first out basis, or based on other factors, such as local resources, security parameters, travel plans of the individual or vehicle on which the individual is to travel, potential disruption to a common carrier, or the like.

The information in the expedited dataset can be used to populate a database (block 428) in a local environment. For example, the information is used by the local server to build a name record that generally mirrors that of the central resource. It should be appreciated that the record on the local resource may not include the extent of information that is stored in memory in association with the central resource. For example, the central resource may include additional biographic information, like information associated with a previous trip taken by the individual.

Block 430 is representative of using the populated information (whether receive via routine or expedited handling) to screen individuals. For example, biometric information obtained from an individual is compared to information in the local database to determine if the information matches sufficiently, such as to a predetermined threshold, to identify the individual. If the individual corresponding to the contemporaneously obtained information matches the information of an individual who is permitted to board and/or entry into the country, the individual is allowed to pass, e.g., board. If the individual does not match, the process may be iterated a predetermined number of times before the individual is rejected, a recommendation or prompt is given to recommend another or alternate procedure, or the like. It should be appreciated that matching may be performed using a proprietary algorithm, e.g., a facial recognition algorithm, a combination of algorithms or biometric data, or information can be compared in a generic form. An example of the latter situation is a collection device or local server genericizes the data before comparing the recently captured information to that which is historical (obtained at a different point in time, such as enrollment of the individual in the identification program).

Additionally, the method 400 can permit, for example, the local resource to accept changes to biometric and/or biographic information that is promulgated back to the central resource at a predetermined time or on the occurrence of an event, e.g., availability of resources. For example, Jan's address changed, but his information otherwise meets a predetermined threshold, the updated information is communicated to the central resource for inclusion in the database. In another example, a young individual's facial image or facial recognition information is automatically added to the record to better identify a passport hold as he/she ages for the period of time his/her passport is valid. In this way, so long as a child/young adult makes use of a system employing the method his/her passport life may be extended with the provision that entry/exit is limited to times when updated images or facial recognition information is available to the system.

In embodiments, central resource and/or a local resource (a local server, collection devices, etc.) can set a flag on, for example, a name record including one or more of biometric or biographic information for a specific individual. For example, the central resource sets a flag on a record that is being released (e.g., used) to a local resource. In this manner, until the local resource releases the flag (or the central resource does so on its behalf, no other local resources can make use of the name record. Thus, if for some reason the local resource loses communication with the central resource, the system (via the flag) ensures that record cannot be reused while communication is broken. The local resource that set the flag can use the information included in the initial list from the name record to match an individual to his/her information as reflected in the name record on the central resource. It should be apparent that such a decision may be a provisional decision that is ratified once communication is reestablished with the central resource. The local and central resource can reconcile their information once communication is restored or thereafter based factors including priority, communication and processing resources, and the like.

In other instances, upon a lapse in communication between the central resource and a local resource that has been populated with information, the local resource (server, collection device, and so on) is prevented from matching an individual until communication is reestablished or may be permitted to do so provisionally.

Block 432 is representative of generating a final manifest that includes information from the comparison process. The final manifest may identify information for the individuals that are traveling on a particular vehicle, a flight. In some implementations, in addition to identifying those individuals that boarded, the manifest may include or the information generated during screening is otherwise associated with the manifest and/or an individual associated with the manifest. For example, facial recognition information for a lap infant is associated with the individual with who the infant is traveling, e.g., the parent or legal guardian. Thus, relational information from screening and/or the mode of travel (flight) can be associated with the individual. An example of the latter information is information that associated an individual with screening or travel information that is not directly associated with the individual himself or herself. In the illustrated embodiment, the final resource is sent to the central resource as part of closing out the transaction with the central resource. The central resource can release the flag as part of this or responsive successful closeout.

Having explained routine and exception based information handling, example data flows are now discussed to permit further understanding of the methods, systems, software, components, disclosed herein.

Figure 5A:
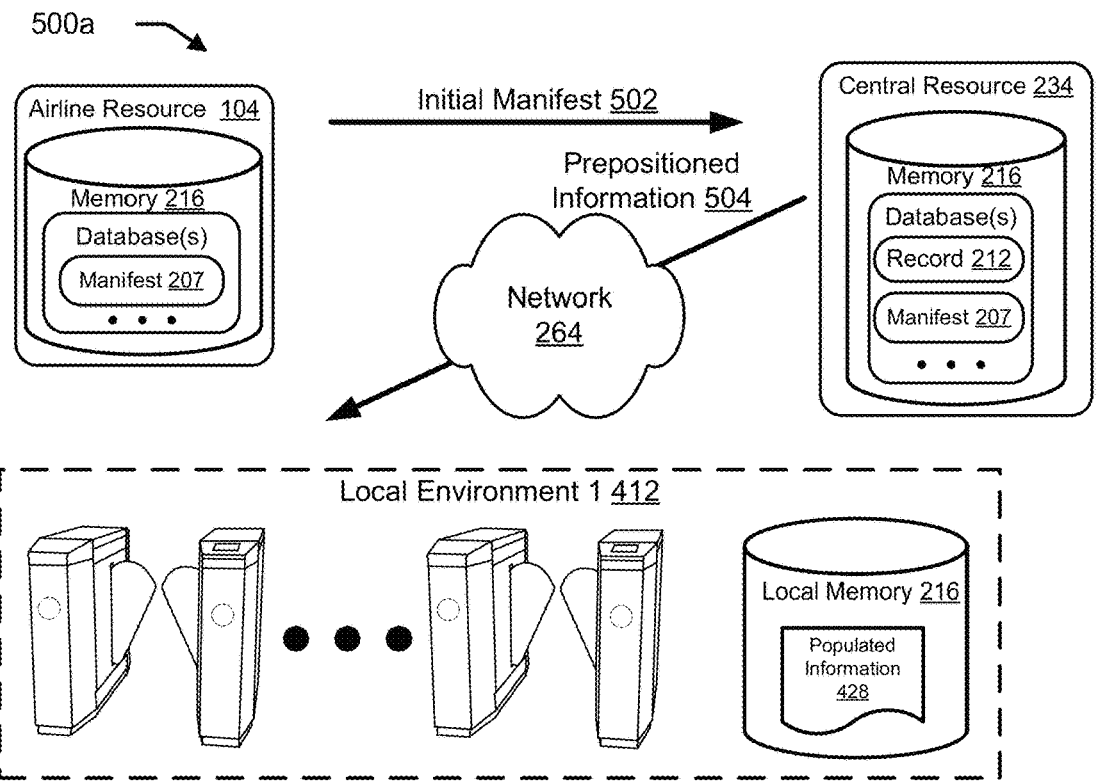
FIGS. 5A-5C illustrate sample data flows in conjunction with hardware/software in accordance with an embodiment. The example hardware/software that is disclosed, the steps, methods, and approaches are not restricted to the illustrated hardware/software.

FIG. 5A is a high level illustration of an example environment 500A including, for example, an airline resource 104 (e.g., a ticketing server) communicating an initial manifest for an upcoming flight. For example, the airline resource 104 sends the manifest 502 approximately 24 (twenty-four) hours prior to scheduled departure. In other instances, the initial manifest 502 can be sent prior and accumulated by the central resource or to another resource acting on behalf of the central resource 234, i.e., an intermediate resource that is dedicated to accumulating manifest information until it is communicated for batch processing by the central resource. The information in the manifest can be communicated in encrypted and/or packetized format according to various communication standards, e.g. TCP/IP protocol. The packet header can include a variety of information to aid communication, data validation, error checking, and so forth.

The information, once received by the central resource, can be processed and stored in a memory associated with the central resource, e.g., redundant data storage like a RAID system. While memory is illustrated as being designated within the "central resource" it is to be apparent that memory may comprise cloud storage (supported by physical data storage) or physical memory that is geographically distinct to prevent, among other considerations, destruction due to natural or manmade disasters. The central resource, in addition to one or more of checking, validating, correcting, formatting or genericizing the information, can store it for subsequent use in screening individual entering/exiting a country. For example, the information is stored in a name record that associates biographic and biometric for an individual. The name record may have been established when, for instance, the individual enrolled in a program, e.g., obtained a passport from his/her county. While the information may be stored in physical proximity in memory, in some instances the central resource indexes the information to aid retrieval and/or permit portions of the information to be stored separately, while being associated by the index. Although all the information in the manifest can be stored, in some examples less than all the information is added or used to update previous information, e.g., an address change. The central resource can be configured to store the manifest itself, in addition to or in place of decomposing the information into individual records. For example, instead of maintaining the manifest in total, the central resource is programmed to store a portion of the information for rapid access, while the central resource indexes the remaining information. The foregoing indexing may include indexing information that previously exists in memory, but that corresponds to information in the manifest.

As discussed previously, the central resource can be configured to build an initial list from, among other resources, information from the manifest and any updates that occurred prior to a criterion being met, updates handled via routine processing and not exception handling. An example of the foregoing is the central resource building the initial list the night before the flight is to occur and communicating the information at that, or near that time, or at some point in time prior to estimated departure of the flight. The central resource may packetize and or encrypt the information for communication.

Upon receipt of the information, the local resource can populate memory with information in a format that mirrors that of the central resource (e.g., name records) or may hold the information forming the list in a unitary form (not that the data is held in sequentially located memory), such as for access by data collection device, e.g., electronic gates capable of collecting biometric/biographic data from individuals and objects associated with individuals, e.g., information magnetically encoded on a driver's license. It is to be appreciated that the local resource can perform a variety of tasks as part of this process. For example, the local resource checks information, examines packet header information, performs error checking, decrypts the information using public/private key encryption, and so forth prior to storing the information for subsequent use.

Figure 5B:
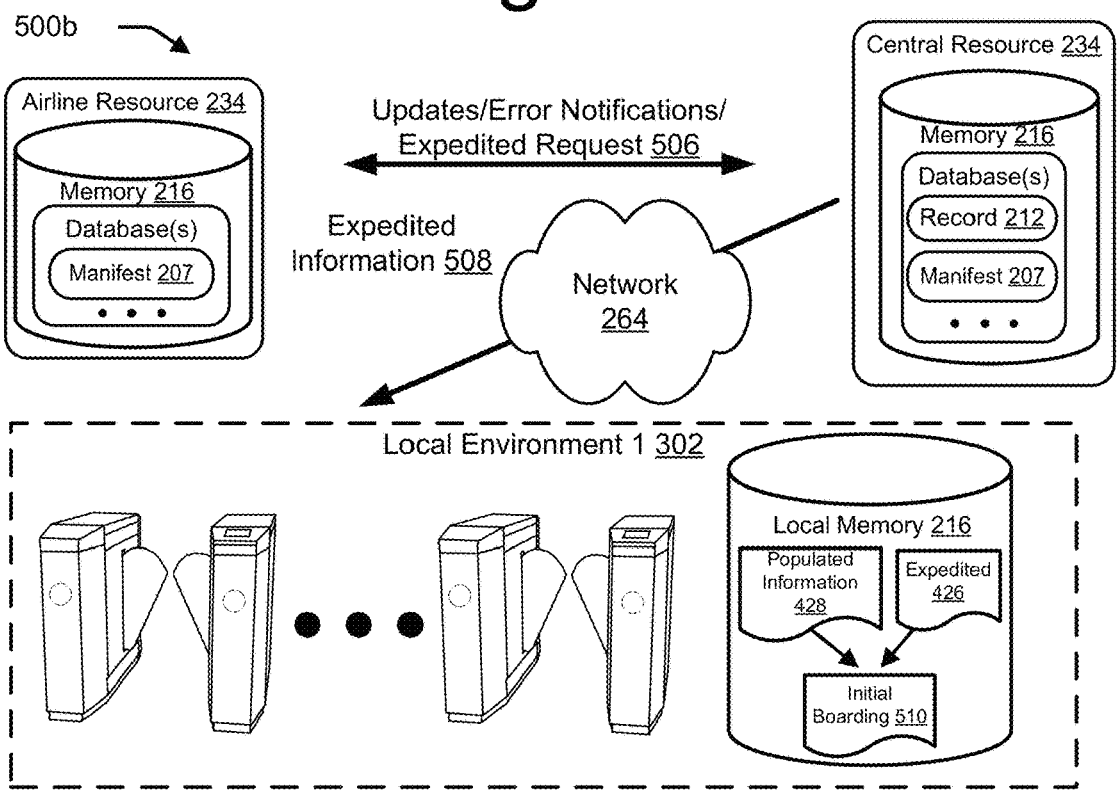

FIG. 5B illustrates an environment 500b that may be substantially similar to that illustrated in FIG. 5A, but at a different point in time. For example, environment 500b represents environment 500a after the occurrence of an event that met a predetermined criterion, e.g. 8 (eight) hour prior to anticipated departure of flight 5400 carrying our friend Jan from Stockholm to Denver.

Once the criterion is met, one or more of the airline resource 104, central resource 234, or local resource (including local memory 216) can operate in expedited information handling mode. In expedited information handling, a request for service may be initiated by the airline issuing a request. "Updates/error notifications/expedited request" 506 is illustrative of such a request, in addition to other functions/communications handled by the airline and central resources. An example of this may be a request to add an individual, William, to a flight for which the criterion is met and/or a corresponding initial list has been sent. Although one such request is illustrated, in embodiments a common carrier or other entity requesting service batches requests for service by aggregating requests such as the current request for a particular flight or those requests generated in a particular time period although not for the same transaction or flight. "Updates/error notifications/expedited request" is also representative of communications from the central resource, such as notification that the task is complete As described in connection with FIG. 4, the central resource 234 can prioritize the request, issue an interrupt as appropriate, access the information using an index that identifies the physical location of the information in memory, process the request, packetize and/or encrypt the information along with any instructions to be carried out by the collection device or local resource involved. The information can be identified by a unique identifier like a passport number that is referenced in the index to the location of the corresponding data. In addition, the central resource may set a flag to prevent information from being used until the flag is removed, such as upon receipt/processing of a final manifest by the central resource.

In embodiments, the central resource's expedited procedures may be substantially similar to those performed during routine data handling, although they may be done to a greater extent based on a variety of factors or include different instructions for the local environment. In other embodiments, additional procedures are used if the transaction meets a particular threshold, e.g., there is a discrepancy in biographic information.

Once processed, the central resource communicates the relevant biometric/biographic information to the local environment, illustrated as expedited information 508. In addition to the biometric and biographic information, expedited information can include reference information that associates the expedited information 426 with that of the initial list (populated information 428). In this way the central resource can instruct the local resource to add the relevant information from the expedited data set for use in boarding 510.

Figure 5C:
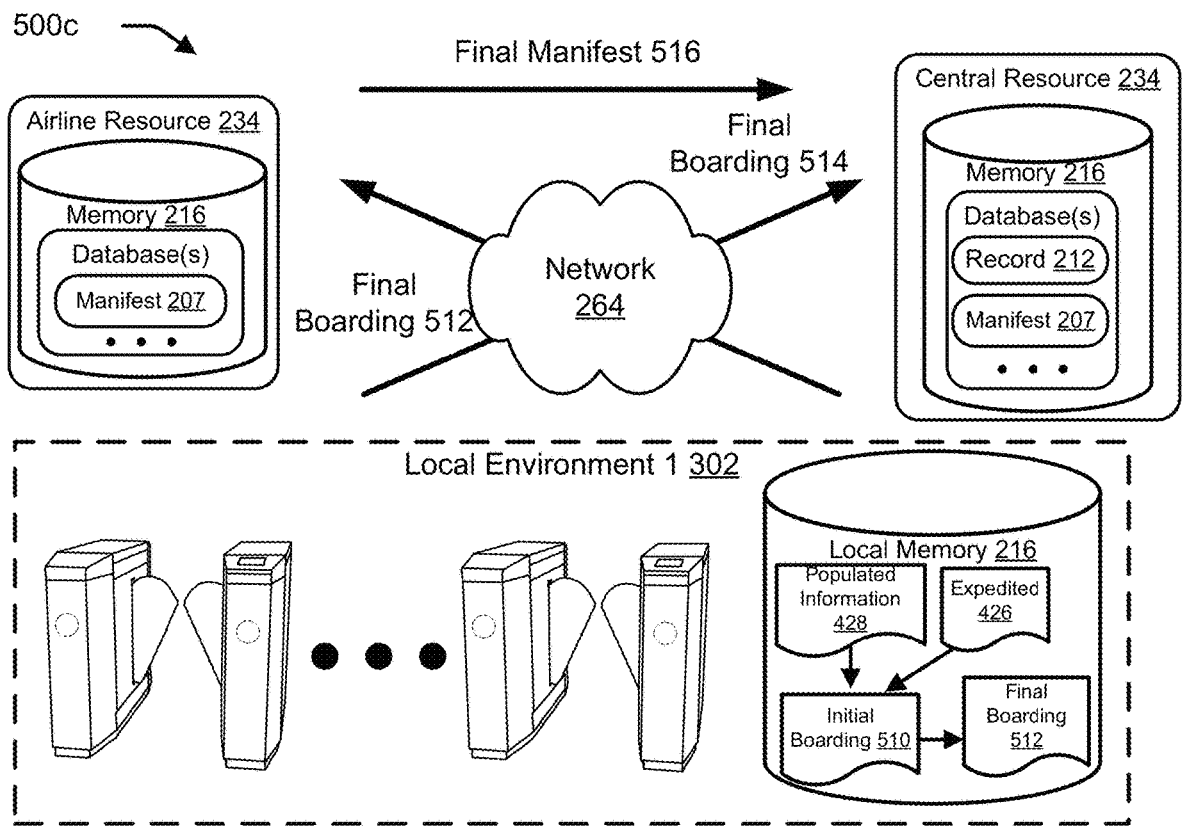

FIG. 5C illustrates an environment 500c that may be substantially similar to those illustrated in FIGS. 5A and 5B, but at a different point in time. As shown, 500c illustrates the local environment generating a final boarding list 512 that indicates which of the individuals from the initial list and expedited dataset(s) boarded. The final boarding list may include additional information, such as updates or additions to biometric/biographic information to be communicated to the central resource. For example, in addition to sending the names of individuals who boarded a flight, the local resource provides images of William in response to the central resource's request for this information. Although final boarding is illustrated as communicated to both to the central and airline resource 512, 514, it should be appreciated that the local resource may provide different information in the final boarding list. For example, the local resource communicates additional biometric information to the central resource 514 while the airline resource receives biographic information 512. In additional embodiments, boarding information is routed through the central resource for subsequent communication to the common carrier (airline). In still other embodiments, the central resource only receives information it instructed the local server to provide, e.g., an updated fingerprint image of Jan.

FIG. 5C also illustrates the airline resource communicating a final manifest to the central resource. The final manifest is representative of, in this instance, the airline's final list of biographic information for individuals that boarded the flight. The final manifest can include information updated as a result of screening/boarding the aircraft. In addition, it can include information generated subsequent to screening/boarding. For example, it may include flight updates for the individuals. Thus, the final manifest can indicate that William will miss his connecting flight to Montreal, and will have to remain in the U.S. overnight until the subsequent day. Other changes that may be reflected in the final manifest include information captured, but not communicated to the central resource as part of an expedited request. Instead of sending all biographic information for an individual that was available to, in this instance, an airline resource, some routine or biographic information that is of minor importance, or not requested or anticipated to be used as a basis of a decision by the central resource, is sent after boarding or departure. In some instances, the information is communicated based on the availability of resources, e.g., communication resources, computing resources.

This disclosure will now turn to discussing enrollment and use of biometric/biographic information for screening individuals, such as by matching an individual to information provided during enrollment. Additional information, beyond that obtained during enrollment can be used to perform biographic matching. For example, a historic image from a previous trip (or information derived from historic biometric information) is at least partially used to match the individual. Although particular steps are described, it will be appreciated that the information use, or the steps, techniques, and approaches can be varied to make efficient use of the computing and communication resources available. Moreover, it is to be understood that the system and devices performing the steps, approaches, and techniques can implement them in an adaptive manner based on a variety of factors that include, but are not limited to, available communication and processing resources, threat conditions, to focus resources on transactions that are comparatively more problematic or pose atypical risk.

Figure 6:
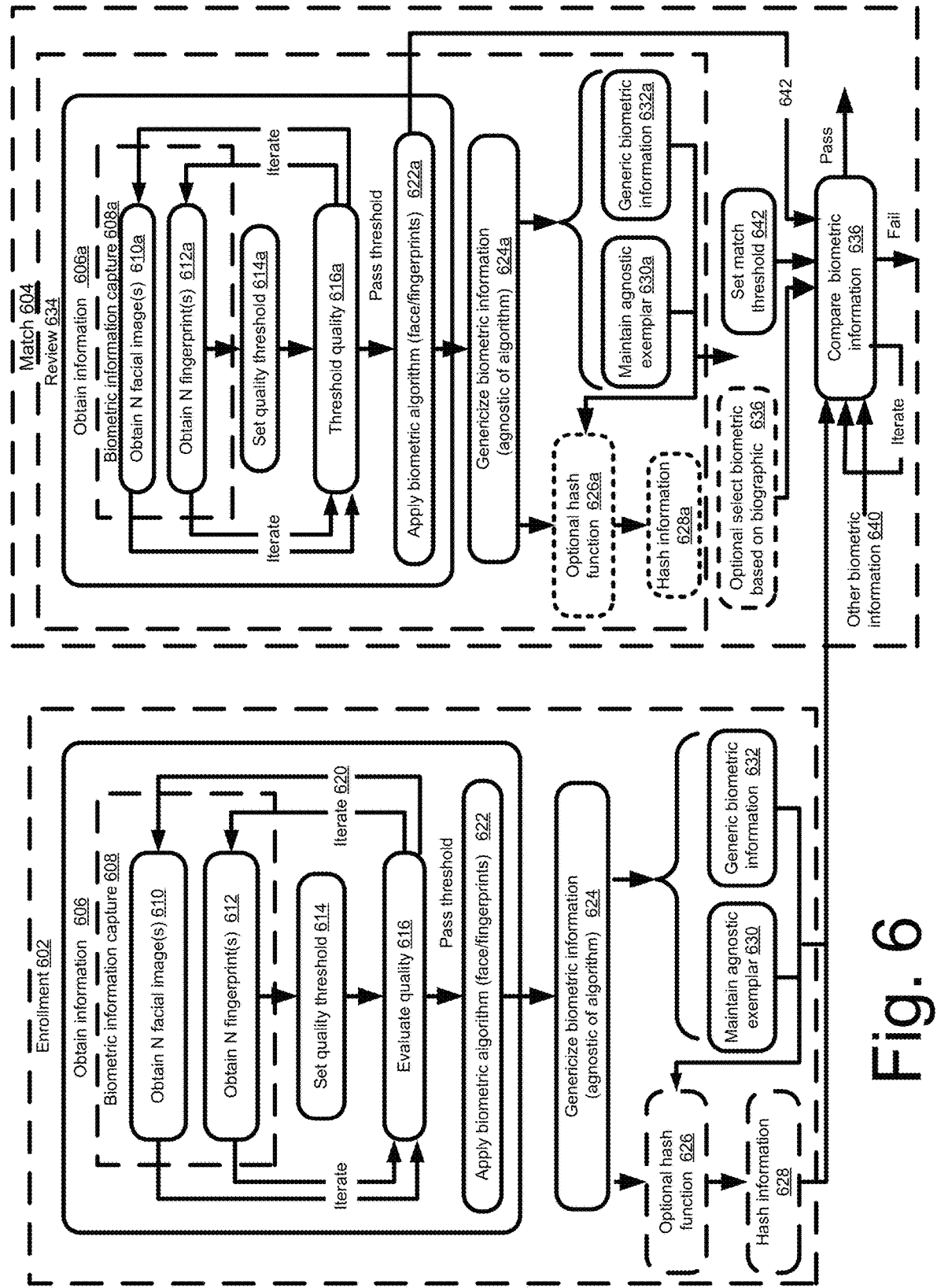
FIG. 6 includes flow diagrams illustrating methods for enrolling and reviewing biometric information for individuals in accordance with embodiments. Embodiments are described where biographic data is also implemented in conjunction with enrolling and reviewing biometric information.

FIG. 6 is a flow chart illustrating example procedures for enrolling (block 602) and matching (block 604) individuals. This disclosure will initially focus on enrollment (block 602) then discuss use of information obtained during enrollment for matching (block 604) an in-question individual to the enrollment information in an effort to match information for the in-question individual to information established during enrollment, e.g., his/her identity. Although biometric information is primarily discussed, it is to be apparent that biographic information can be collected and used in conjunction with obtaining (block 606) and use of the biometric information.

For example, a unique identifier (e.g., passport number, name) is associated with biometric information to streamline use of the biometric information to match an individual (block 604). One example of streamlining is using biographic information to identify biometric information that is to be used as a basis of matching information for an in question individual.

Associating biographic with biometric information can minimize the computation burden associated with matching captured biometric information to historic biometric information. While the foregoing may be done to minimize the burden on resources, in some examples captured biometric information is compared to multiple sets of biometric information, if for example biographic information is not available or a user implements the system to learn the identity of an individual such as if information for an in-question individual does not meet a threshold, or to determine if the individual has previously enrolled.

For example, a system operating in accordance with the method down-selects biometric information of individuals having names that are similar to or otherwise potentially relevant to Jan's name as part of an enrollment or matching processes. For instance, if a known terrorist uses an alias similar to Jan's name, the system can be configured to also compare Jan's biometric information or a portion thereof to that of the known terrorist to ensure the known terrorist is not posing as Jan. This is to say, a system operating in conformance with this disclosure can perform negative matching (excluding) in addition to positive or affirmative matching. This can be performed during enrollment to minimize the likelihood of individual enrolling using another person's identity or during matching. Like affirmative matching, negative matching may be done to a predefined threshold to ensure the in-question individual is not associated with information for an excluded individual, e.g., the known terrorist.

Biographic information can be collected contemporaneously with biometric information during enrollment (block 602).

As illustrated, biometric information is captured (block 608) during the enrollment process. Capturing biometric information (block 608) in embodiments includes capturing an image of an individual's face (block 610), fingerprint(s) (block 612), or iris(es). Although facial image capture is primarily discussed, it is to be apparent that other biometric attributes can be handled in a similar fashion. Other example attributes include, scars, walking habits, and body proportions, and so forth that are indicative of an individual.

When capturing an image, the device implementing the method can capture multiple images. For example, a digital camera captures a video of an individual's face or different wavelengths of energy are used/captured, e.g., visible light and near-infrared light. In some instances, the individual is instructed to remain in a fixed position during image capture, while in others a video is obtained while the individual moves to a pre-established position at which he/she is to remain. In examples in which multiple images are obtained, information can be obtained from one of the images, e.g., a single image, or information is obtained from multiple images, e.g. biometric, that is to be stored is amalgamated from multiple images.

As illustrated, enrollment includes setting one or more quality thresholds (block 614) for the biometric information to be captured. The quality threshold may be set at various times, e.g., predetermined before enrollment (block 602) commences or during enrollment 602. For instance, a system dynamically sets the threshold based on a variety of factors including, but not limited to, biographic information (age), risk factors (e.g., suspicious passport loss, previous travel), biometric features (e.g., presence or absence of facial hair), a security level for the system, entity, or country.

A wide variety of image quality assessment (IQA) algorithms and other biometric information quality threshold algorithms can be used by a device performing the method. Examples include maximum likelihood difference scaling (MLDS), full-reference (FR) and reduced-reference (RR), structural similarity index (SSIM), and the like for determining whether a captured image is of sufficient quality for use.

The captured biometric information, e.g., a facial image or information from an image, is evaluated (block 616) to determine whether the biometric information meets the threshold for quality. For example, a device performing enrollment implements an image quality algorithm to determine if an image is sufficiently sharp, has acceptable contrast, meets a hue standard (e.g., color is accurate to a standard (RGB standard) so as to be suitable for use. In the preceding example, use may be used as an image, e.g., for display to a user, in other instances use includes serving as a basis for obtaining facial recognition information.

Responsive to a determination that the biometric information meets the threshold (pass threshold), the method proceeds to apply a biometric algorithm (block 618) to the captured information. Responsive to a determination that the biometric information does not meet the threshold (non-pass or failure), additional biometric information may be obtained or previously obtained biometric information is evaluated until it meets the threshold. The thresholding process can iterate 620 until the occurrence of an event, for a set number of iterations, or a predetermined period of time, iterate for 30 (thirty) seconds. The foregoing presumes the threshold is not met during the specified period or the criterion is not met.

A biometric identification algorithm is applied (block 622) to the biometric information (e.g., facial image, fingerprint image, iris image). For example, the work station 262, applies a facial recognition algorithm to information forming a facial image of an individual captured during enrollment. In this example, the facial image is information from an image that passed the threshold, so it is suitable for use.

Biometric identification algorithms can implement a variety of approaches for obtaining information, such as calculating or otherwise processing information to generate a signature that is indicative of the underlying biometric information. For example, the facial recognition algorithm derives a biometric signature of a person's face from the information comprising the image such as by extracting information of features that can be used for identification. In embodiments, a biometric signature is information that maps biometrically identifiable features. The facial recognition algorithm, for instance, can map facial features including relationships between features in order to develop a biometric signature of the individual's face. Example features include, but are not limited to, eyes, nose, skin, ears, mouth, facial features (moles, freckles). Other features include facial hair (e.g., hair patterns), skin wrinkles, eyelids, mouth shape, hand geometry, signature, voice, and lips.

A variety of algorithms can be used for facial recognition and it should be apparent that a system employing the method may use different algorithms, whether proprietary or not. For example, individual work stations, collection devices (e.g., kiosks, electronic gates) may use different algorithms. Example algorithms include, but are not limited to principle component algorithms, Eigenface based algorithms, algorithms using elastic matching, and algorithms employing linear discriminant analysis. Additional algorithms include Fisherface based algorithms, hidden Markov model based algorithms, and multilinear subspace learning algorithms. In some embodiments, combinations of algorithms and approaches can be used.

Fingerprint analysis can be performed in a manner similar to that of facial recognition. For example, a fingerprint mapping algorithm is used to identify features that are indicative of the individual's fingerprint represented in an image in a digital format. Example fingerprint, multi-fingerprint, palm print, and "slap print" algorithms include, but are not limited to, Vucetich system, the Roscher system, the Juan Vucetich system, or the Henry System.

Other algorithms based on pattern recognition can also be used. Similar to the discussion regarding facial recognition, a fingerprint algorithm can generate a signature, sometimes referred to as a template, which represents the fingerprint represented in the image, the captured fingerprint. While a biometric signature is obtained for the fingerprint, it should be evident that the underlying image, e.g., an image of the fingerprint, can be maintained for use. A fingerprint image, similar to that of other images discussed herein, can be maintained in a variety of formats, including but not limited to: jpeg, tiff, gif, pdf, rif, png, ppm, bpg, cgm, svg, and rs-274x.

Example iris recognition algorithms include, but are not limited to IriScan (IriScan, Inc. Mt. Laurel, NJ), Indian (Indian Technologies, Moorestown, NJ), Sarnoff (Sarnoff Corp., West Winsor Township, NJ), Sensar (Sensar, Inc. Moorestown, NJ), LG-Iris (LG Electronics, Seoul, Korea), Panasonic (Panasonic, Inc. Kodama, JP), Oki (Oki Electric Industry Co., Ltd. Tokyo, JP), BI2 (BI2 Technologies Plymouth, MA), IrisGuard IrisGuard, Inc. Buckinghamshire, UK), Unisys (Unisys, Inc. Blue Bell, PA), Sagem (Safran SA Paris, FR), Enschede (joh. Enschede Security Solutions Haarlem, Netherlands), Securimetrics (Securimetrics, Inc. Martinez, CA), and L-1 (Morpho, SAS Issy-les-Moulineaux, FR).

In addition to the algorithm's output, additional information can be provided as well. For example, a computing system performing the method may include metadata that is associated with the biometric information, e.g., the biometric signature of the individual's face represented by the image. Example metadata includes information that uniquely identifies the image, date, time, software version, what software was used, error checking results, physical device information, location, timestamp, vendor information, biometric information, image information, use input information (such as observations from an official overseeing enrollment) and so forth.

Block 624 is representative of genericizing biometric information. Genericizing can involve making, such as by converting, the information into a format that is agnostic of way in which the information was obtained. Genericizing, for example, includes converting a facial recognition signature into a format that is not indicative of the algorithm used to obtain the information comprising the signature in the non-generic form. An example of non-generic information is biometric data that indicates or is reflective of the use of, for example, a proprietary algorithm to obtain or process the information.

In embodiments, genericizing (block 624) converts biometric information obtained through use of a particular type of algorithm, such as a proprietary algorithm, into a format that complies with a predetermined standard that is generic or agnostic of the particular algorithm and/or information capture system used to obtain the information. In some instances, genericizing includes discarding information beyond that to be reflected in the generic dataset. In other examples, genericizing includes translating biometric information to a form that is generic from that of the algorithm and/or information capture used to obtain the information. The American National Standard for Information Systems' standards are examples. Information may be compliant with one or more of NISTIR 6529-A, ANSI/NIST-ITL 1-2000 (for exchange of facial, fingerprint, scar, and tattoo information), ANSI/INCITS 358-2002, standards promulgated by International Committee for Information biometrics committee (M1), INCITS 377, ANSI INCITS 377-2004, ANSI INCITS 378-2004 (Finger Minutiae Format for Data Interchange), or the like standards for exchanging biometric information.

An optional application of a hash function is illustrated as block 626. In embodiments, genericized information is hashed, e.g., subject to or has a hash function applied to it. In some instances, multiple hash functions are used for various purposes. Example purposes and by extension hash functions include, but are not limited to, mapping information and encrypting the information for communication and/or storage. Although biometric information hashing will be primarily discussed, biometric information or a combination of biometric and biographic information can be hashed as appropriate. Hash 626 can be used to map biometric information captured in, for example, an electronic fingerprint image to generate a hash code that is indicative of the image.

For example, a hash of an image of individual's fingerprint includes information that is indicative of the fingerprint image as a whole, although it does not include all the content information from the image, e.g., information sufficient to entirely represent the captured fingerprint. This is to say that some information from, in this example, the fingerprint image is more indicative than other information in the fingerprint image. Put another way, the hash code (e.g., the result of applying an algorithm that performs the hash) can include information that more accurately identifies the fingerprint and by association the corresponding individual than other information contained in the image of the fingerprint. The information resulting from application of the hash is illustrated as 628. It should also be apparent the underling information (e.g., a fingerprint image, voice pattern) can be maintained even though the information is hashed.

It is also to be apparent some information although not per se in the information itself is derived from the information, e.g., relative distance between facial features, and may be performed by the hash algorithm. For example, fingerprint, as well as other biometric matching (whether confirmatory or excluding), biometric identification carry a high computational burden in order to determine whether or not an individual associated with the information is a match or non-match. Rather than looking at for example all biometric information or substantially all biometric data obtained, an appropriate hash algorithm is applied to generate a hash code/hash sum, that may contain less information (e.g., less bytes of data) but remains indicative, highly indicative, or substantially highly indicative of the underlying information, e.g., a facial image, fingerprint image, voice pattern. In this way, the communication and computational burdens on a system or device performing the method is reduced in comparison to handling/processing the underlying information, e.g., the biometric image information. The hashed information (block 628) can be stored in a hash table or other data structure (e.g., a register) as appropriate.

Other hash functions can be implemented in addition to or in conjunction with those discussed. For example, a cryptographic hash function is used to encode information that is intended to remain secret. Example cryptographic hash functions include, but are not limited to, SHA-1, SHA-2, and SHA-3, that are promulgated by the U.S. National Institute of Standards and Technology (NIST), public-private key encryptions algorithms. For example, block 626 is representative of applying a biometric hash function to a fingerprint image to obtain a hash sum and then applying a cryptographic hash, such as SHA-2, to the hash sum to encrypt it for communication (whether internal or external to the system or device) and/or data storage.

Blocks 630 and 632 are illustrative of, respectively, maintaining an agnostic exemplar of the obtained information and generic biometric information. Example exemplars include a captured facial image, an image of a fingerprint, file containing a vocal recording, a video, and the like that include information that is usable to bio-identify or exclude an individual. Block 630 represents maintaining the captured biometric information in a form that is agnostic of format used by the particular device used to capture the information or used by devices within the system. In some embodiments, the generic information is maintained in a common format that implemented by some individual devices in the system or none of the devices within the system, e.g., is distinct from native formats. For example, instead of maintaining images in a variety of formats, a system or device implementing the method converts images into a tagged image format file (.tiff).

It should be appreciated that the agnostic exemplar (e.g., an iris image or a voice pattern in a non-proprietary format) and/or the generic biometric information can be encrypted via the hash function, such as for security reasons, while remaining in generic or agnostic form. Maintaining a copy of the underlying biometric information permits the system to go back to the original source information, provides information for system users, e.g., a voice recording, a picture of an individual's face. It permits the system to apply a new or different algorithm to the biometric information, allows for algorithm checking (e.g., accuracy checking), permits the system to use the exemplars to check the system or act as a learning or training set. An example of the latter situation is an adaptive facial recognition algorithm training on stored exemplars to improve or confirm its accuracy.

Those of skill in the art will also appreciate that a system/device performing the method can for instance compress, transform, or manipulate obtained information whether biographic or biometric. For example, a work station compresses a file containing a facial image prior to storing the compressed file in memory. Example data compression algorithms include Lempel-Ziv type algorithms, PKZIP, JPEG image compression, MPEG-2 image compression, MP3 format (in comparison to standard digital audio formats), and so on whether lossy compression or not.

Turning now to matching, which is illustrated as bounded by block 604, use of biometric and/or biographic information for matching (whether affirmative or negative) is discussed.

Many of the steps, approaches, techniques used in enrollment may be mirrored generally or specifically to that which occurs in the matching process. For simplicity, steps, approaches, techniques that are similar or substantially similar or generally have a similar basis to those that occur during enrollment are reference by the suffix "a." No negative inference should be obtained for not bearing the "a" suffix. It should be apparent that the information whether biometric or biographic may be obtained at a different point in time than that captured or processed during enrollment. The foregoing presumes, the individual being screen has indeed enrolled. For example, a facial image being captured for review process 634, is obtained by a camera or an image collection device for an electronic gate when a traveler seeks to enter or exit a country. It should be appreciated that the same, substantially the same, or different thresholds, algorithms, etc. can be used for matching in comparison to those used in enrollment. For example, threshold quality (block 614*a*) is set to a higher level due to a heightened security status or other criterion than that applied at enrollment or a preceding point in time.

As illustrated, matching 604 can be performed using a variety of biographic and biometric to determine whether information obtained at a point in time subsequent to enrollment matches or is excluded (non-match) from that obtained at a previous point in time, e.g., historic biometric information.

For example, a system performing the method compares (block 636) information for a fingerprint captured when an individual attempts to enter a restricted area with a fingerprint provided during enrollment that is asserted to match, such as based on biographic information, or input manually. While matching can be done by comparing all or substantially all of the biometric information captured during enrollment, as discussed above a subset of the information or information derived from the biographic information (e.g., output of a biometric algorithm) can be used for matching (block 636). Optional selection of what biometric information is to be used as a basis for matching can be used to down select what historical biometric information the currently captured information is to be compared to (illustrated as block 638). In the preceding example, a badge number for the individual entering the restricted space is used to locate historical fingerprint information in a lookup table stored in local memory, if for example the individual was a worker who presented a magnetic or radio frequency identification (RFID) card prior to providing his/her fingerprint. In the preceding example, the historical fingerprint information is prepositioned with the access control device to speed access in comparison to retrieving the information responsive to receipt of the badge number, although this too is possible if for example the system did not predict (via an algorithm based on historical access information) the individual would request access.

In embodiments, comparison 636 is iterated until it yields a pass or until: the occurrence of an event, a set number of iterations, or a predetermined period of time, e.g., iterate for 30 (thirty) seconds. The foregoing presumes the comparison is not met during the specified period or the criterion is not met. In this instance, the comparison "fails" and corresponding processes triggered, e.g., alert user, deny passage (through electronic gate), capture additional biometric information, issue a "fail receipt", provide a visual indicator, direct the in-question individual according to a fail determination, a fail record is created in memory and is promulgated with biometric/biographic information from the event, combinations thereof, and so forth. The foregoing is done responsive to a determination that the comparison is a "fail" and a system/device can be programmed to trigger a variety of responses.

An affirmative or pass outcome is representative of the comparison 636 indicating the biometric information for the in-question individual matches historic biometric information as designated by biographic information, e.g., a provided passport number. Responsive to this determination, the system performing the method can execute a variety of procedures. Example pass procedures include, but are not limited to, opening an electronic gate or barrier, providing a visual pass indicator, issuing a pass receipt, collecting additional biometric information, updating biographic information (e.g., add the pass event to the individual's biographic information), combinations thereof, and the like programmed responses.

Setting a match threshold (block 640) is representative of a system/device that performs the method designating a level that the biographic information for the in-question individual has to match historic biometric information (e.g., enrollment information) in order to pass. For example setting a match threshold designates a level of similarity that is indicative of the currently obtained information being the same or substantially similar to enrollment information.

The match threshold can be predetermined based on a criterion. The threshold level can be set manually, such as for a heightened security level, or may be adaptively determined by the algorithm based on one or more criterion that are intrinsic, extrinsic, or a combination thereof criterion, e.g., including intrinsic and extrinsic. In the case of a manual threshold, the predetermined criterion is the user's selection. Example intrinsic criterion include, but are not limited to, date of last transaction, date since enrollment, biometric information quality, lack of biometric information (e.g., missing fingerprint information), age, travel plans, biographic information, time. Example extrinsic criterion include: threat status, information from other screenings (e.g., an increase level of low quality matches or low quality biometric information from other matches), number of screenings, wait times, and so forth. While a system/device performing the method can dynamically change the threshold, in some instances the system/device implements a floor or minimum acceptable threshold that limits the lowest acceptable match. While individuals can be screened at a higher threshold, the minimum acceptable level sets the lowest match level that can be used, e.g., the threshold level for individuals with the lowest risk, whether real, calculated such as based on biographic information, or anticipated.

In some implementations, historical and subsequent biometric information is compared in a non-generic form. For example and is illustrated as line 642, biometric information is compared in a proprietary format. In instances such as this, biometric information from enrollment may be transformed into non-generic information by applying an appropriate algorithm, e.g. a particular algorithm used by a device performing the review or implemented in local environment, such as at an airport. In instances such as this, the local environment can receive the information comprising the exemplar and/or apply a relevant algorithm prior to when a match is anticipated to occur. An example of the preceding situation is a system applying an algorithm responsive to the information being prepositioned with the system performing the method. A non-generic comparison can be used when generic information is unavailable, attempted generic matches are unsuccessful.

In some embodiments, information for an individual being screened is compared to biometric information for individuals meeting a predetermined criterion 644, e.g., individuals who are wanted by authorities or are to be handled in a particular manner, such as additional or heightened screening in comparison to that used for the majority of individuals being screened. In these embodiments, a comparison is done to exclude the in-question individual based on his/her biometric information from the biometric information associated with those meeting the criterion. The information for the individuals meeting the criterion may be maintained in a register, in for example random access memory (RAM) in a solid state medium (e.g., in a register in local solid state memory) within the device to promote efficient operation.

It should be apparent in some embodiments that not all individuals being matched will be subject to comparison based on the other biometric information 644. For example, only individuals meeting a prescreening criterion may have his/her information reviewed in this manner. In another example, if all individuals represented in the information 644 are males, then in-question females may be excluded without review. Other criterion include, age, anthropomorphic characteristics, including but not limited to eye color, height, weight, associated biographic information and so forth.

Those of skill in the art will appreciate that a threshold for non-matching may be set to a lower level than that of matching, e.g., a fifty percent (50%) non-match yields an affirmative exclusion while affirmative matching is done to a higher level of correspondence or similarity. In other examples, such comparison is based on less biometric information than that used for affirmative matching. For example, a subset of fingerprint information, such as information that is highly indicative or substantially highly indicative of the overall fingerprint, is used to speed the comparison 636 based on the other biometric information 640. Having discussed enrollment and matching, additional embodiments of the methods and structures in accordance with this disclosure are now provided.

Figure 7:
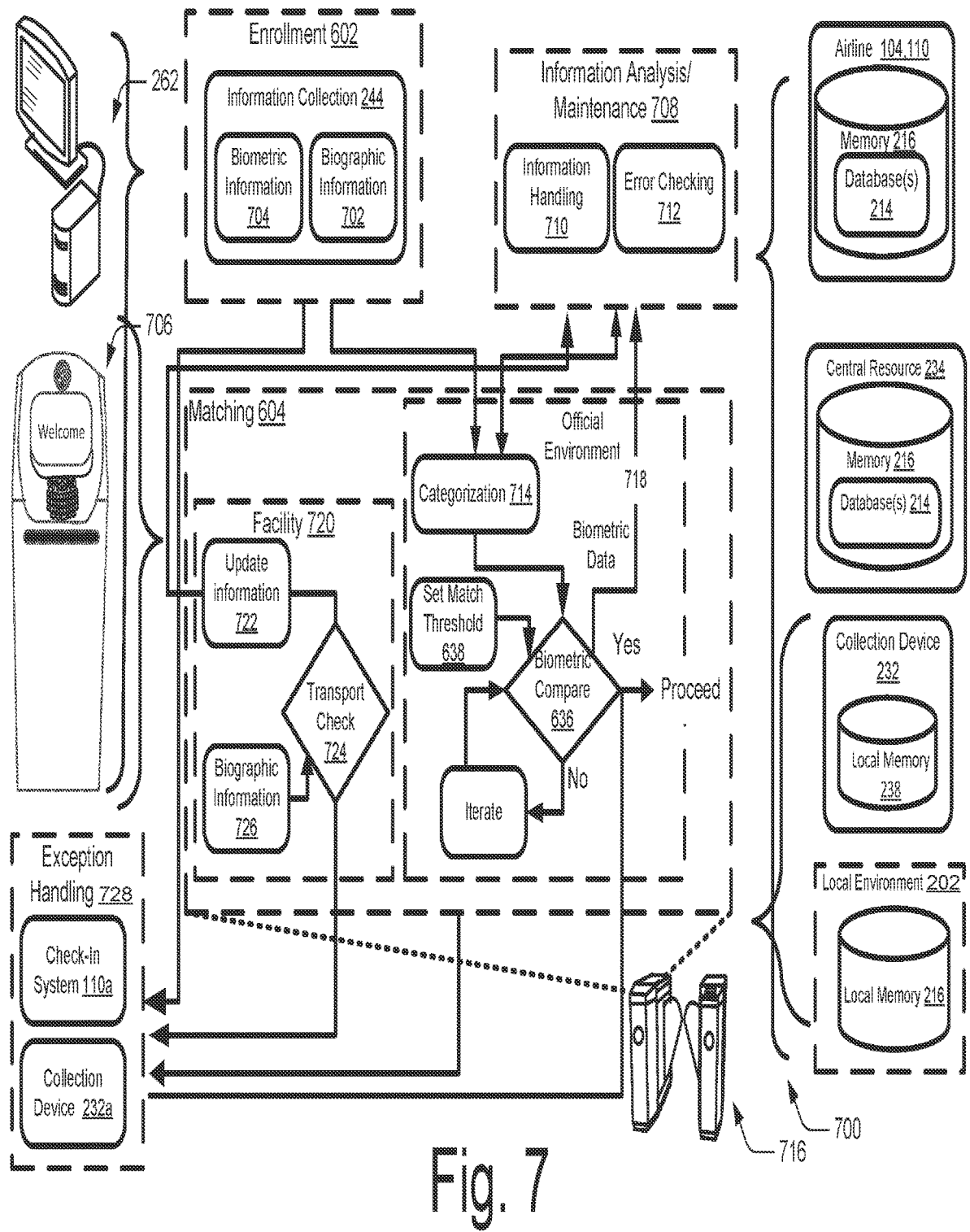
FIG. 7 illustrates example routing and data handling in accordance with embodiments of the present disclosure. Although example hardware/software is disclosed, the steps are not restricted to the hardware/software and vice versa.

FIG. 7 illustrates example environments 700 implementing routing and information handling in accordance with embodiments. Although physical devices are illustrated, it will be apparent that the method, steps, approaches, and techniques are not restricted to the physical device or systems and vice versa. For illustrative purposes, collection devices 232, an airline system 234, central resource 234, collection device 232, and a local environment 202 302 are illustrated in conjunction with the environments 700.

FIG. 7 shows how information, such as biographic and biometric information (702, 704) can be used in, for example, systems performing massive scale screening of individuals or other applications that implement biometric information and particularly large scale systems. In embodiments, the systems, devices, methods, techniques, and approaches described in conjunction with FIGS. 1-6 can be implemented with those described with respect to FIG. 7. As shown, enrollment information such as collected by work station(s) 262, kiosk(s) 706, mobile devices (smart phone, laptops, connected personal devices), sensors, and image capture devices is maintained for subsequent use 708. For example, as individuals enroll his/her information is obtained and stored in a redundant manner such as in memory 216 associated with a central resource 234. The central resource or other devices performing the described function performs various information handling tasks 710 such as indexing the information, storing the information such as in a distributive/redundant fashion, compressing the information, genericizing the information, encrypting the information, and so on as described in this disclosure.

In the illustrated embodiment, the information is error checked 712. Error checking, in addition to checking for data errors due to data storage and computing issues, can also check the information for suitability for use in biometric matching. For example, the central resource 234 periodically or as a background operation checks stored biometric information to determine whether it is suitable for use with update software, algorithms, use as a training dataset, and compatibility with an information format. Non-compliant information (e.g., corrupt data or a file with incompatible information) can be flagged for additional review or non-use. For example, responsive to a determination that a fingerprint image is corrupt (whether completely or partially) or does not meet a quality standard, the system can capture the missing, corrupt, or otherwise unavailable information the next time the individual is screened. In other instances, if the underlying information is available, the central resource can recreate the data, e.g., reprocess a fingerprint image to recreate the fingerprint issue that is missing or corrupt. In the previous example, recreation is performed in a substantially similar manner to that described in conjunction with biometric information capture.

Block 604 illustrates biometric matching involving multiple environments (e.g., computing environments). In the illustrated embodiment, systems and devices within different environments interact to effectuate substantially seamless matching. The environments contain systems, devices, and components that operate in official, non-official, and commercial settings and can operate on differing levels of trust and transparency. For illustrative purposes only, an official environment is an environment that is associated with a high trust level and may operate at least partially in an opaque manner to obscure selected information and processes. For example, while systems, devices and components operating in the official environment may communicate and interact with a facility environment, such as one run by a port authority or a quasi-governmental entity, it may do so without granting a reciprocal level of access to systems, devices, components in a commercial environment (e.g., airline 104, 110) or in the facility environment.

As illustrated in FIG. 7, individuals can be categorized 714 prior to matching 604 based on a predetermined criterion. In the illustrated instance, individuals are categorized according to whether he/she is in-scope or out of scope. For illustrative purposes only, in-scope and out of scope correspond to particular legal statuses. For example, citizens, diplomats, and permanent residence are screened differently or to a different extent than individuals that are in-scope.

As previously discussed, matching includes comparing 636 subsequently captured biometric information with historical biometric information (e.g., biometric information 704) to associate an individual via his/her information with corresponding historic biographic information, e.g., name, passport number. The matching comparison 636 can be iterated until an affirmative response is obtained or a predetermined criterion is met, e.g., a percent match is less than a designated level such as seventy-five percent (75%). The threshold for the comparison 636 is set in step/block 638.

Although percent match or a level of similarity that is to be met is predetermined prior matching, it should be apparent that the percentage can vary between discreet instances. For example, responsive to information indicating criminal or illegal activity is anticipated, the match level is raised from a 90% (ninety percent) match to a 95% (ninety-five percent match) for the entire system or a portion of the system, such as a particular facility. In another instance, a system or device performing the method is programmed to randomly raise the threshold beyond a base threshold (e.g., a minimum acceptable pass) to deter individuals attempting to pose or circumvent the system. An example of an intrinsic factor is lack or poor quality of another type of biometric information. For example, a system or device performing the method is programmed to apply a higher match threshold when comparing one type of biometric information if another type of biometric information is missing. Thus, an electronic gate device can be programmed to implement a ninety-seven percent (97%) match to a facial identification, rather than a ninety-two percent (92%) match, if for example no historic iris information is available for the individual. Naturally, the system or device performing the method can capture the missing information or substitute information if the information is of poor quality, e.g., the file containing an image lacks information or the quality of the information does not meet a predetermined quality threshold.

A successful match, e.g., the comparison meeting the predetermined match level, is illustrated as "proceed." For example, responsive to the system or device determining that the comparison meets or exceeds the match threshold, the electronic gate opens to permit the individual to pass. As with the method, techniques, and approaches discussed with respect to FIG. 6, those of FIG. 7 can be used with non-matching or confirming information associated with an in-question individual does not match that of individuals that meet a predetermined criterion, e.g., information associated with a criminal or missing individual.

In some instances, a system or device performing the method is configured to dynamically change the threshold level. If for instance, a match is not made within the first three tries a system or device performing the method is programed to elevate the threshold level from a first level to a second or different threshold level to ensure system accuracy, avoid inadvertent mismatching, etc. In situations such as this, the first level can correspond to a match level that is typically obtained for the majority or a substantial majority of the population being screened, while the higher level corresponds to a heightened level of scrutiny that a smaller percentage of the population of the individuals being screened meet or exceed. The threshold level can dynamically change based on other criterion, such as image quality or historical information is missing/corrupted for another type of biometric information. An example of the foregoing is a system imposing a higher match threshold when the concurrently captured image meets a criterion, e.g., is of a poor quality according to a predetermined criterion. Another example is a system programed to apply a higher fingerprint match threshold when voice pattern information is missing.

As illustrated, line 718 is representative of communicating/storing information gathered during matching 604 for subsequent use. For example, the system or device updates the biometric information for the individual in question if he/she has not recently used the system, is young, or has changed his/her appearance (e.g., recently grown a beard), or passed the comparison but not sufficiently so thereby indicating a weak or minimal match.

Turning now to the processes, procedures and techniques illustrated in conjunction with the environment entitled "Facility" 720. In the illustrated embodiment, the facility environment corresponds to steps and devices that, for example, are performed or managed by an entity that supports matching, but may operate on lower trust level than that of the official environment. In embodiments, procedures, devices, information in the official environment may be opaque to activities and devices in the facility 720 to prevent misuse, cyberattack, hacking, and so forth.

For example, the official environment contains a firewall that blocks or minimizes what information, requests, and so forth can pass between the official and facility environments. The firewall can also obfuscate or generalize the structure within the official environment and/or the central resource. In other embodiments, the official environment, such as a customs computing in an airport, is isolated by a separate firewall from that of an environment containing the central resource and/or the information analysis/maintenance functionality. Thus, in some instances the central resource operates at the (comparatively) highest level of trust/security than that of the official environment (e.g., the local server, collection devices), and the facility functions at a lower level of trust/security.

The illustrated embodiment highlights a situation in which biographic information is presented that is not available to a system, e.g., an airline system like 104, 110. An example of such a situation is an individual changing flights. In this situation, the biographic information (e.g., a boarding pass) is not yet entered in the system and the individual's biographic information populated to for instance a flight manifest. In this instance, the biographic information associated with the boarding pass is checked 724. A system performing the check may do so by issuing an expedited request to interrupt the information analysis/maintenance 708 function which may be supported by the central resource 234. If the check is successful, e.g., the biographic (travel) information associated with the boarding pass corresponds to the information for an individual who is to be on the flight, the biographic information is updated 722 such as by adding the information to the manifest for the flight.

In instances where the check 724 results in a negative decision, the information can be routed for exception handling 728. Can involve checking biographic information associated with the boarding pass or other token to determine if it is associated with, for instance, another flight, train, or ship. For example, an individual biographic information is associated with a canceled flight. In the foregoing example, a system/device performing the method can associate or re-associate the individual's information with a new or different flight so his/her biometric information 704 can be associated with the new or different flight, train, ship, other mode of transportation, or an event, e.g., a college placement testing session. Exception handling can be handled by a variety of devices and systems. As illustrated an airline system, like a check-in system 110a (for clarity the suffix "a" has been added) or airline work station handles the task. In other instances, exception handling is performed by a device or component included in an official system, such as a work station or a collection device 232a like a kiosk. As should be apparent, in some embodiments exception handling may involve routing an individual to a representative or a customs official that may manually override the system/device/component performing exception handling to cause the method to achieve a user designated result, e.g., associate the information for the individual with a particular event, mode of transportation, or the like.

Referring now to FIGS. 8A and 8B, methods, approaches, devices, and techniques for capturing and utilizing biometric information are described. In embodiments, a system or device performing biometric matching captures multiple versions of a particular type of biometric information in order to down-select one or more individual instances for use. For example, instead of capturing a still image for use in facial recognition, a system operating in accordance with the illustrated embodiment captures a video composed of a plurality of images, e.g., frames. The foregoing may be done in order to obtain one or more images that are suitable for use in biometric identification.

It should be apparent that while down-selecting and use of a subset of the information is implemented for one purpose the underlying information can be used for other purposes. For example, in the case of a video, one or more images are used for facial recognition while the overall video or a portion thereof is used to determine the individual's walking pattern.

Referring to FIG. 8A, from left-to-right with respect to the caption "FIG. 8A", an individual entering, moving through an area, capturing formal information (biometric), being delayed, and exiting the area that includes an electronic access control device with, for example, an image capture capability is illustrated. An example of such a situation is a customs or security screening area included in an airport. In the preceding example, whether formally or informally designated, an information collection device, such as may be in or associated with an access control device, is configured to capture a video of the individual as he/she enters a field of view, proceeds through, and exits an access controlled area.

Capturing a video (e.g., multiple images) permits a system or device employing the method to down-select from among the images, such as by using an algorithm that determines a quality score for in question images. As discussed, one image will be used for, in this instance, facial recognition. In other instances, more than one image is used as the basis for biometric information matching. For example, an electronic gate is configured to identify a predetermined number of images that meet a predefined image quality and then compute an average facial recognition signature that is compared to a facial recognition signature associated with a passport. One example of why this may be done is in situations where biometric information from multiple angles (relative to the device capturing the information) is more accurate than that obtained at a single point in time or from a single perspective, although this too is contemplated.

Respectively, the stages are illustrated as initial entry 802, moving area 804, formal information capture 806, report hold 808, and exit 810. Although illustrated as discrete steps or phases, it will be appreciated that the process may be unitary and capture, or at least partially capture other individuals in the area or adjacent areas. Moreover, the video may be complied from more than one information capture device. For example, a resulting video is composed of video from one or more surveillance cameras as well as a camera included in an electronic access control device. The biometric information input (e.g., the different videos) may be synchronized using a common clock in order to merge biometric information from a single point in time or a substantially single point in time.

In some instances, the information capture devices have different capabilities, e.g., cameras/image capture device operate at for example different wavelengths based on a variety of criteria. Here too the information is synthesized to generate a dataset that can be used for generating a biometric signature for comparison to that on record to match the in question individual to that of an individual stored in memory via his/her biometric information. While individual devices, e.g., electronic gates with information collection functionality are discussed, in other instances an "overall" system, such as for an airport or a portion of a facility, can be used and perform the methods/steps. In instances such as this the electronic access control devices (e.g., "man-traps") including information collection capability may be considered "thin devices" with limited resources while a system for the facility, such as an airport, handles the bulk or majority of the information processing.

With reference to FIG. 8B, biometric information analysis commences from a predefined point in time or a predefined event in embodiments. For example, determining which image is to be used from a video for biometric matching commences from a predetermined point. An example of the foregoing is an electronic gate being programmed to determine whether a formal image is of sufficient quality to be used for matching. If the formal image is of sufficient quality as determined by an applicable algorithm, the image is used. In contrast, if the formal image is not of sufficient quality (e.g., the image is blurry or the individual closed his/her eyes), the algorithm causes in this case the electronic gate to analyze an image that is after the formal image to determine if it is of sufficient quality. If it is, then the subsequent image is used, if not the process iterates according to the algorithm. It should be apparent, that the device may set a flag to identify the particular data upon which matching is based. For example, a processor in a server for local environment 302 handling matching for the electronic gate sets a flag to indicate which frame of a video is used for facial recognition.

Lines "A-C" (respectively labeled 812, 814, 816) illustrated in FIG. 8B show example approaches for analyzing which image or images to use. For example, line "A" illustrates analyzing images from initial entry 802 until an image meets a predetermined threshold, e.g. is of sufficient quality for use or meets a particular criterion defined by the algorithm. In this example, the method can still include obtaining a formal image, while in other instances a device performing the method dispenses with requesting and obtaining a formal image. In other instances, even though biometric information that will be used for matching has already been obtained, the method can still include requesting/obtaining a formal image for record purposes, for use in updating or augmenting the individual's biometric information, or record information. In other instances, an unused formal image is discarded.

Line "B" of FIG. 8A, is representative of initiation biometric information suitability analysis occurring from a formal biometric information capture. As illustrated, analysis for suitable information commences with an event, e.g., formal image capture, and may proceed with evaluating information that is subsequent to or precedes the formal information capture event. It is to be apparent that this process may proceed in a variety of ways depending on a variety of factors. For example, if computing resources are available, suitability commences according to line "A", while a line "B" approach is used when resources, comparatively, are less available.

Example procedures include, but are not limited to, analyzing information subsequent to the predetermined event for a particular time or number of iterations and then analyzing information that precedes the event in reverse chronological order until suitable information is located. In other instances, a device performing the method switches between information obtained prior to and subsequent to the event, e.g., the computer/processor analyzes images just prior to the event and if it does not meet the predetermined threshold it analyzes an image just after the event, e.g., an image immediately after the formal image or a set period of time or number of frames afterward.

In still other instances, more than one image (e.g., a block of information/images) is analyzed for suitability before switching to images that occurred on the other side of the event. For example, ten images occurring after an event are analyzed before analyzing ten images obtained before the occurrence of the event. The foregoing presumes that a suitable image is not identified in the ten subsequent images.

It should be apparent that the system can also switch based on a predetermined criterion, such as image quality. In this instance according to an applicable algorithm, if the image is sufficiently low or for example a face is not recognized, the device is configured to switch to other portions of the information, e.g., another part of the video.

These processes can iterate until information meeting the predetermined threshold is located at which point the analysis terminates and the information is used for comparison, e.g., hashed and then the hash is compared to a hash of corresponding information for the presented token, e.g., passport. A device performing the method optionally can set a flag to identify the particular information used, e.g., the information meeting the predetermined quality threshold.

As also illustrated in FIG. 8B, line "C" is representative of commencing an analysis from a report hold event. Much like the process discussed in conjunction with line "B", information can be analyzed in a variety of ways as determined by the device's software. For example, an image or multiple images corresponding to a report hold are evaluated for suitability, e.g., image quality. The method continues to analyze images occurring just prior to the report hold, presuming an image corresponding to the report hold does not meet the threshold. For example, responsive to a determination that an image or images corresponding to the report hold are not sufficient for use in biometric matching, a processor checks information associated with the formal biometric information capture (e.g., the formal image) to determine if it is suitable for use.

A report hold 808 is representative of a timeframe after one or more of biometric information is captured or formally requested, but before one or more of the following has occurred the in question individual is permitted to pass (e.g., the electronic gates open), a successful biometric information capture is reported, the device reports the outcome of the match, e.g., match successful. For example, the report hold time frame occurs or at least partially occurs between when formal biometric information is requested (and may be captured) and a device performing the method reports the individual's facial image is successfully captured. In some embodiments, device performing the method delays opening the access control device or reporting an outcome in order to obtain additional information, e.g., images. In some instances, a device causes a visual cue to be displayed to direct an individual's attention toward a display device such as a monitor or touch screen that is also aligned with an information capture device. In one instance, by doing this an individual may naturally align his/her face toward the display device and thus the capture device without responding as he/she would if prompted for a formal image, e.g., smiling. This may be preferential as it may permit more accurate facial identification in comparison to an image representing the individual's smiling face.

In some embodiments, opening of the access control device and/or reporting an outcome is delayed several seconds to obtain one or more images. In embodiments, the delay hold is approximately 5 (5) seconds, 5 (five) seconds or less, between 1-10 (one to ten) seconds, between approximately 1 (one) to 3 (three) seconds, less than (20) twenty seconds, at or approximately near (20) twenty seconds or less, and so forth. In embodiments, the time associated with the report hold is designed to be or approximate a processing delay or a perceived processing delay so that individuals being screened are not aware that additional information is being obtained and may act naturally while still facing the image capture device, e.g., digital camera. In some instances, a device or system performing the method causes a display device to output an innocuous message, like "processing" or "please wait" to cause an individual to direct his/her face toward a display device that may be aligned with a camera. Employing a report hold may beneficial for obtaining information, such as images, that are suitable for use in biometric matching. In some instances, while the formal information is used for matching, information from the report hold period is retained as it is likely suitable for use. The foregoing may occur even when remaining information is discarded. For example, periodically the system deletes video, but retains images associated with a formal image and report hold for historical purposes.

In embodiments, the approach or approaches taken by one or more devices for locating suitable biometric information can dynamically change based on a variety of factors including, but not limited to, resource demand, individual (e.g., passenger) wait times, an individual's characteristics (age, facial hair change, etc.) time of day, threat level, to introduce the perception of uncertainty or randomness to individuals being screened, or to obtain information associated with adjacent individual. In other instances the approach implemented by a device or system performing the method is varied (e.g., time enlarged) to collect additional information to be included in the record of the individual. For example, the method captures (comparatively) more images of a child that obtained a passport 3 (three) years ago than a child that obtained his/her passport in the last year. Not only can this information be maintained for record purposes, but it may be used to more accurately match the child the next time he/she travels. It should be apparent that the method may adaptively change in such situation based on biometric characteristics (e.g., perceived age of individual) and/or biographic information, e.g., an age associated with a provided token, such as a passport.

An example of the latter situation is upon identifying that an adjacent individual has characteristics associated with a child (e.g., an individual of diminutive stature), the system or device performing the method attempts to capture and analyze biometric information earlier on or closer to initial entry than is currently implemented. For example, responsive to determining a child has entered a predefined area, a system performing the method may attempt to analyze image quality for a subsequent adult during initial entry 802 or moving 804, instead of waiting for the subsequent adult to reach hold phase before analyzing the information to determine if it meets the threshold.

CONCLUSION

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not be taken as limiting or restricting the systems, techniques, approaches, methods, devices to those appearing in any particular section. Rather, as will be appreciated by one of skill in the art, the teachings and disclosures herein can be combined, rearranged, with other portions of this disclosure and the knowledge of one of ordinary skill in the art. It is the intention of this disclosure to encompass and include such variation.

What is claimed is:

1. A system for permitting access to an individual comprising:
   a collection device comprising a first processor, first memory, capture device, first communication unit, and first tangible computer readable storage media storing an information module having a program of instructions stored in a non-transitory manner;
   an access control device comprising an opened and closed position;
   a central resource comprising a second processor, second communication unit, second memory, and matching module comprised of non-transitory computer executable instructions constructed to enable the second processor to perform tasks; the matching module configured to determine whether the individual meets a predefined criterion associated with predefined procedures; the central resource configured to create a record of information about the individual; and the central resource configured to store the record in the second memory;
   the collection device configured to:
      responsive to receipt of a unique identifier, determine at least partially based on the unique identifier whether an individual associated with the unique identifier is to be subject to biometric information collection;
      responsive to a determination that the unique identifier is indicative of biometric information collection, collect biometric information that includes an image of the individual;
      convert biometric information obtained through use of a proprietary algorithm into a format that complies with a predetermined standard that is generic or agnostic of the proprietary algorithm and information capture system used to obtain the information;
      hash the converted biometric information; the hash indicative of the information as a whole, but not including all content of the information;
      compare the hashed biometric information with corresponding biometric information from a database;
      determine whether hashed biometric information matches the corresponding biometric information to a predetermined percentage match;
      dynamically adjust the predetermined percentage match subsequent to said comparing and determining;
      based on determining that hashed biometric information matches the corresponding biometric information to a predetermined percentage match, generate a successful determination;
      communicate the successful determination to the central resource; and
   the central resource configured to instruct the access control device to switch from the closed position to the opened position responsive to the successful determination by the collection device.

2. The system according to claim 1, wherein the predetermined percentage match is dynamically adjusted based on at least one of: a general security level, additional or different biometric factors, additional or different matching information, a degree of accuracy, throughput, use of historical information for comparison of biometric information, or reaching a predetermined threshold number of unsuccessful attempts to match biometric information to previous required percentage match.

3. The system according to claim 2, wherein the program of instructions includes instructions that is operable to cause the second processor to adjust the predetermined match based on another type of biometric information's quality.

4. The system according to claim 1, wherein the system is configured to dynamically adjust the predetermined percentage match for the biometric information-based on a lack of another different type of biometric information.

5. The system according to claim 1, wherein the collection device is configured to:
   collect biographic information from the individual; and
   compare the biographic information provided when access is requested to a database that contains biographic information associated with individuals that meet the predefined criterion.

6. The system of claim 5, wherein the program of instructions is further configured to compare at least some of the biometric information provided when access is requested with corresponding biometric information in database of information for individuals that meet the predefined criterion to biometrically identify the individual who requested access.

7. The system of claim 5, wherein:
   the collection device communicating at least a portion of information to the central resource;
   the central resource is configured to check whether individuals corresponding to records in a database meet a predetermined criterion; and
   the program of instructions is further configured to identify the individual by comparison of at least some of the biometric information collected contemporaneous with a request for access with at least some of the biometric information in the database that meet the predetermined criterion.

8. The system of claim 1 wherein the central resource is configured to store the record in a database of the second memory;
   check whether the individual corresponding to the record in the database has overstayed his or her visa;
   populate an overstay database with information about the individual who overstayed his or her visa; and
   flag the record by including information in the record that shows the individual has overstayed.

9. The system of claim 1 wherein the matching module is further configured to:
   determine that the individual matches a particular record, the particular record containing information of an entrance of the individual;
   check information for the individual against a list, registry, table or a database as part of a matching process;
   determine whether the individual is allowed to exit; and
   apply procedures associated to facilitate the exit.

10. The central resource of claim 1 configured to:
    preposition information among resources to promote efficient overall system processing or communication in order to avoid bottlenecks;

send an initial list to a server supporting an airport at night before a flight is scheduled to depart to free the central resource to handle requests made on an expedited basis in a more efficient manner; and receive an initial manifest; the manifest associated with a particular time slice and an airport location; the manifest containing biographic information for passengers on a particular flight.

11. The central resource of claim 10 configured to:
receive an initial manifest at least 48 hours prior to an expected departure time; and
receive an updated manifest 24 hours prior to the expected departure time.

12. The system of claim 1 configured to: communicate a final manifest to the central resource; the final manifest comprising an airline's final list of biographic information for individuals that boarded an associated vessel; and the final manifest including information updated as a result of screening prior to boarding the associated vessel.

13. The system of claim 1 wherein the central resource or the collection device is configured to:
associate biographic information with biometric information to minimize computation burden associated with matching captured biometric information to historic biometric information; and
capture biometric information to compare to multiple sets of biometric information when biographic information is not available or to determine whether the individual has previously enrolled.

14. The system of claim 1 wherein the central resource or the collection device is configured to:
collect information of the individual including a name;
down-select biometric information of individuals having names that are similar to or otherwise potentially relevant to the name of the individual; and
compare biometric information of the individual to a known terrorist to ensure the known terrorist is not posing as the individual.

15. The system of claim 1 wherein the central resource or the collection device is configured to:
collect information of the individual including a name;
set a threshold for non-matching of biometric information to a lower level than that of matching;
down-select biometric information of individuals having names that are similar to or otherwise potentially relevant to name of the individual; and
negative match and positive match the individual during enrollment to minimize chances of the individual using another individual's identity.

16. The system of claim 1 configured to:
capture biometric information from an image; and
perform an image quality algorithm to determine whether the biometric information meets a threshold for quality for sufficient image sharpness, acceptable contrast, and hue standards.

17. The system of claim 1 configured to genericize biometric information by converting the biometric information into a format that is agnostic of how the biometric information was obtained.

18. The system of claim 1 configured to:
convert biometric information obtained through use of a proprietary algorithm into a format that complies with a predetermined standard that is generic or agnostic of the proprietary algorithm and information capture system used to obtain the information; and
hash the converted biometric information; the hash indicative of the information as a whole, but not including all content of the information.

19. The system of claim 1 configured to:
set a match threshold;
collect biographic information of the individual;
access historic biometric information of the individual;
designate a level that the biographic information for an in-question individual has to match the historic biometric information; and
set the match threshold to require the biographic information to be same or substantially similar to historic information.

20. The system of claim 1 configured to:
provide a match threshold; the match threshold predetermined based on a criterion;
adaptively determine the match threshold by an algorithm based on one or more criterion that are intrinsic, extrinsic, or both intrinsic and extrinsic;
wherein intrinsic criterion is selected from the list consisting essentially of: date of last transaction, date since enrollment, biometric information quality, lack of biometric information, age, travel plans, biographic information, and time;
wherein extrinsic criterion is selected from the list consisting essentially of: threat status, an increased level of low quality matches, number of screenings, and wait times;
provide a minimum level of match threshold; and
dynamically change the match threshold above the minimum level of match threshold.

21. The system of claim 1 configured to:
capture biometric information in a proprietary form;
transform biometric information from enrollment into non-generic information by applying an algorithm;
compare historical and subsequent biometric information in a non-generic form;
apply the algorithm responsive to the biometric information being prepositioned with the central resource; and
execute a non-generic comparison if generic information is unavailable or previously attempted generic matches are unsuccessful.

22. The system of claim 1 configured to:
categorize the individual prior to matching based on a predetermined criterion;
categorize the individual as in-scope or out-of-scope; and
screen in-scope individuals differently than out-of-scope individuals.

23. The system of claim 1 configured to:
set a threshold for comparison;
provide a match level to be met before matching;
responsive to information indicating criminal or illegal activity is anticipated, increase the threshold; and
randomly raise the threshold beyond a base threshold to deter individuals attempting to circumvent the central resource.

24. The system of claim 1 configured to:
determine at least one type of biometric information missing; and
apply a higher match threshold to the predetermined percentage match when determining whether the hashed biometric information matches the corresponding biometric information.

25. The system of claim 1 configured to:
communicate or store biometric information gathered during matching for subsequent use; and update the biometric information for the individual if he or she has not recently used the central resource, has changed his or her appearance, or passed a comparison by a narrow margin.

26. The system of claim 1 configured to:
determine which image is to be used from a video for biometric matching commences from a predetermined point; and
programming an electronic gate to determine whether a formal image is of sufficient quality to be used for matching.

27. The system of claim 1 wherein the central resource or the collection device is configured to delay opening the access control device by several seconds to obtain one or more images.

28. The system of claim 1 configured to:
delay opening the access control device by a period of time approximately equal to a processing delay;
output an innocuous message on a display device aligning with a camera to cause an individual to direct his or her face toward the camera; and
capture additional information while the individual is unaware additional information is being captured.

29. The system of claim 5, wherein the program of instructions is further configured to:
match biometric information obtained contemporaneously with an exit request with biometric information in the database that meets the predetermined criterion; the match biometric information having a first accuracy value;
match to identify an individual in the database; the match to identify an individual having a second accuracy value;
determine that the first accuracy value is higher than the second accuracy value.

30. The system of claim 1 comprising an information module containing: a script or program of instructions configured to validate information collected by the collection device; the script or program comprising an algorithm configured to: weigh the collected information to determine validity; and implement validation rules for validating collected information; the validation rules configured to: check for inconsistencies, errors, or omissions in names or addresses; and verify the collected information contains a specified number of digits or a numerical pattern.

31. The system of claim 30 comprising an event trigger configured to trigger validation based on an event; the event comprising at least one of entering text, checking a box or button, browsing to a new page, or selecting enter.

32. The system of claim 31 wherein the information module comprises a result table stored in memory configured to store validation records; the validation records including data associated validation errors, successes, information correction for the event that triggers validation; the data in the validation records comprising a score.

33. The system of claim 32 wherein the information module is configured to use the score to determine whether the individual has provided false or misleading information to the collection device.

34. The system of claim 33 wherein the collection device comprises the information module.

35. The system of claim 31 comprising data validation logic configured to validate entered characters for the event.

36. The system of claim 1 comprising a biometric module comprising a quality algorithm configured to: determine whether a facial image comprises sufficient quality to be used for matching; and select from multiple images to determine which image, if any, is of sufficient quality to be used for matching.

37. A method for permitting access to an individual comprising:
an access control device opening to permit the individual to continue if a signal from a collection device is received; the collection device comprising a first processor, first memory, capture device, first communication unit, and first tangible computer readable storage media storing an information module having a program of instructions stored in a non-transitory manner;
a central resource creating a record of information about the individual; the central resource comprising a second processor, second communication unit, second memory, and matching module comprised of non-transitory computer executable instructions constructed to enable the second processor to perform tasks; the matching module configured to determine whether the individual meets a predefined criterion associated with predefined procedures;
the central resource storing the record in the second memory;
responsive to receipt of a unique identifier, determining by the collection device, at least partially based on the unique identifier whether an individual associated with the unique identifier is to be subject to biometric information collection;
responsive to a determination that the unique identifier is indicative of biometric information collection: collecting by the collection device, biometric information that includes an image of the individual;
converting by the collection device, biometric information obtained through use of a proprietary algorithm into a format that complies with a predetermined standard that is generic or agnostic of the proprietary algorithm and information capture system used to obtain the information;
hashing by the collection device, the converted biometric information; the hash indicative of the information as a whole, but not including all content of the information;
comparing by the collection device, the hashed biometric information with corresponding biometric information from a database;
determining by the collection device whether the hashed biometric information matches the corresponding biometric information to a predetermined percentage match;
dynamically adjusting by the collection device, the predetermined percentage match subsequent to said comparing and determining;
based on determining that hashed biometric information matches the corresponding biometric information to a predetermined percentage match, generating by the collection device, a successful determination;
communicating by the collection device, the successful determination to the central resource; and
instructing by the central resource the access control device to open responsive to the successful determination by the collection device.

38. The method of claim 37 comprising:
a local environment obtaining information about an individual;
the local environment matching information about the individual with the obtained information;
the local environment allowing the individual to pass; and the local environment performing the obtaining and matching contemporaneously.

39. The method of claim 37 comprising an exit process wherein the central resource compares biometric information captured contemporaneously from an individual with that of an entry record and biometric information from an identity token.

40. The method of claim 37 comprising:
storing exit information with information collected upon entry; and
completing an entry record.

41. The method of claim 37 comprising an exit process wherein the matching module determines that an individual matches a particular record with information about the individual's entry.

42. The method of claim 41 wherein the matching module checks information for an individual against a list, registry, table, or database as part of the matching to determine whether the individual should be allowed to proceed.

* * * * *